United States Patent
Trivelpiece et al.

(10) Patent No.: US 11,928,538 B2
(45) Date of Patent: *Mar. 12, 2024

(54) SYSTEMS AND METHODS FOR LASER TUNING AND ATTACHING RFID TAGS TO PRODUCTS

(71) Applicant: Sensormatic Electronics, LLC, Boca Raton, FL (US)

(72) Inventors: Steve E. Trivelpiece, Santa Margarita, CA (US); Adam S. Bergman, Boca Raton, FL (US); Amin Shahidi, Milwaukee, WI (US); George H. West, Wellington, FL (US); Bjoern Petersen, Lubbock, TX (US); João Vilaça, Dubai (AE); Gopal Chandramowle, Boca Raton, FL (US); Carlos Gomez Garcia, Las Rozas (ES); Melwyn F. Sequeira, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/819,983

(22) Filed: Aug. 16, 2022

(65) Prior Publication Data

US 2022/0391657 A1 Dec. 8, 2022
US 2023/0267298 A9 Aug. 24, 2023

Related U.S. Application Data

(63) Continuation of application No. 17/025,890, filed on Sep. 18, 2020, now Pat. No. 11,443,160, which is a
(Continued)

(51) Int. Cl.
*G06K 19/07* (2006.01)
*G06K 19/077* (2006.01)

(52) U.S. Cl.
CPC .............. *G06K 19/07758* (2013.01)

(58) Field of Classification Search
CPC ................................ G06K 19/07758
(Continued)

(56) References Cited

U.S. PATENT DOCUMENTS 5,963,144 A  10/1999  Kruest
6,147,655 A  11/2000  Roesner
(Continued)

FOREIGN PATENT DOCUMENTS

CN  101523605 A  9/2009
CN  101711430 A  5/2010
(Continued)

OTHER PUBLICATIONS

International Search Report and Written Opinion For International Patent Application No. PCT/US2020/051625, dated Dec. 21, 2020 (152 pages).

(Continued)

*Primary Examiner* — Daniel A Hess
(74) *Attorney, Agent, or Firm* — ARENTFOX SCHIFF LLP

(57) ABSTRACT

Aspects of the present disclosure relate to methods and systems for laser turning and attaching RFID tags to products. Such methods and systems may include a memory and a processor coupled to the memory. The methods and systems may include determining a characteristic of a conductive trace on a substrate to be incorporated into an item to configure a tag performance in view of at least one of a dielectric property or a tuning property of the item. The methods and systems may further include a laser to alter the conductive trace on the substrate to have the characteristic to define an antenna for the tag. The methods and systems may further include an attaching device configured to attach a (Continued)

communications enabled device to the substrate so as to form an electrical connection between the communications enabled device and the antenna to form the tag.

24 Claims, 13 Drawing Sheets

Related U.S. Application Data continuation-in-part of application No. 16/685,508, filed on Nov. 15, 2019, now Pat. No. 10,783,424, and a continuation-in-part of application No. 16/685,584, filed on Nov. 15, 2019, now Pat. No. 10,970,613.

(60) Provisional application No. 62/902,355, filed on Sep. 18, 2019.

(58) Field of Classification Search
USPC .......................................................... 235/492
See application file for complete search history.

(56) References Cited

U.S. PATENT DOCUMENTS

| | | |
|---|---|---|
| 6,152,348 A | 11/2000 | Finn et al. |
| 6,229,443 B1 | 5/2001 | Roesner |
| 6,265,976 B1 | 7/2001 | Roesner |
| 6,646,336 B1 | 11/2003 | Marmaropoulos et al. |
| 6,690,264 B2 | 2/2004 | Dalglish |
| 6,967,579 B1 | 11/2005 | Elizondo |
| 6,982,190 B2 | 1/2006 | Roesner |
| 7,026,935 B2 | 4/2006 | Diorio et al. |
| 7,026,936 B2 | 4/2006 | Roesner |
| 7,030,786 B2 | 4/2006 | Kaplan et al. |
| 7,038,544 B2 | 5/2006 | Diorio et al. |
| 7,038,573 B2 | 5/2006 | Bann |
| 7,038,603 B2 | 5/2006 | Diorio et al. |
| 7,049,964 B2 | 5/2006 | Hyde et al. |
| 7,054,595 B2 | 5/2006 | Bann |
| 7,061,324 B2 | 6/2006 | Diorio et al. |
| 7,064,653 B2 | 6/2006 | Dalglish |
| 7,107,022 B1 | 9/2006 | Thomas et al. |
| 7,116,240 B2 | 10/2006 | Hyde |
| 7,119,664 B2 | 10/2006 | Roesner |
| 7,120,550 B2 | 10/2006 | Diorio et al. |
| 7,123,171 B2 | 10/2006 | Kaplan et al. |
| 7,154,283 B1 | 12/2006 | Weakley et al. |
| 7,158,408 B2 | 1/2007 | Roesner et al. |
| 7,183,926 B2 | 2/2007 | Diorio et al. |
| 7,187,237 B1 | 3/2007 | Diorio et al. |
| 7,187,290 B2 | 3/2007 | Hyde et al. |
| 7,199,456 B2 | 4/2007 | Krappe et al. |
| 7,199,663 B2 | 4/2007 | Diorio et al. |
| 7,212,446 B2 | 5/2007 | Diorio et al. |
| 7,215,251 B2 | 5/2007 | Hyde |
| D543,976 S | 6/2007 | Oliver |
| D546,819 S | 7/2007 | Oliver |
| D546,820 S | 7/2007 | Oliver |
| D546,821 S | 7/2007 | Oliver |
| D546,822 S | 7/2007 | Oliver |
| D547,306 S | 7/2007 | Oliver |
| D547,754 S | 7/2007 | Oliver |
| 7,245,213 B1 | 7/2007 | Esterberg et al. |
| 7,246,751 B2 | 7/2007 | Diorio et al. |
| D548,225 S | 8/2007 | Oliver |
| 7,253,719 B2 | 8/2007 | Diorio et al. |
| 7,253,735 B2 | 8/2007 | Gengel et al. |
| 7,283,037 B2 | 10/2007 | Diorio et al. |
| 7,304,579 B2 | 12/2007 | Diorio et al. |
| 7,307,528 B2 | 12/2007 | Glidden et al. |
| 7,307,529 B2 | 12/2007 | Gutnik et al. |
| 7,307,534 B2 | 12/2007 | Pesavento |
| 7,312,622 B2 | 12/2007 | Hyde et al. |
| D562,810 S | 2/2008 | Oliver |
| D563,397 S | 3/2008 | Oliver |
| 7,375,626 B2 | 5/2008 | Ening |
| 7,380,190 B2 | 5/2008 | Hara et al. |
| D570,337 S | 6/2008 | Oliver |
| 7,382,257 B2 | 6/2008 | Thomas et al. |
| 7,388,468 B2 | 6/2008 | Diorio et al. |
| 7,389,101 B2 | 6/2008 | Diorio et al. |
| 7,391,329 B2 | 6/2008 | Humes et al. |
| 7,394,324 B2 | 7/2008 | Diorio et al. |
| 7,400,255 B2 | 7/2008 | Horch |
| 7,405,659 B1 | 7/2008 | Hyde |
| 7,405,660 B2 | 7/2008 | Diorio et al. |
| D574,369 S | 8/2008 | Oliver |
| D574,370 S | 8/2008 | Oliver |
| 7,408,466 B2 | 8/2008 | Diorio et al. |
| 7,417,548 B2 | 8/2008 | Kavounas et al. |
| 7,419,096 B2 | 9/2008 | Esterberg et al. |
| 7,420,469 B1 | 9/2008 | Oliver |
| 7,423,539 B2 | 9/2008 | Hyde et al. |
| D578,114 S | 10/2008 | Oliver |
| 7,432,814 B2 | 10/2008 | Dietrich et al. |
| 7,436,308 B2 | 10/2008 | Sundstrom et al. |
| 7,448,547 B2 | 11/2008 | Esterberg |
| 7,469,126 B2 | 12/2008 | Miettinen et al. |
| 7,472,835 B2 | 1/2009 | Diorio et al. |
| D586,336 S | 2/2009 | Oliver |
| 7,489,248 B2 | 2/2009 | Gengel et al. |
| 7,492,164 B2 | 2/2009 | Hanhikorpi et al. |
| D587,691 S | 3/2009 | Oliver |
| 7,501,953 B2 | 3/2009 | Diorio et al. |
| 7,510,117 B2 | 3/2009 | Esterberg |
| 7,518,516 B2 | 4/2009 | Azevedo et al. |
| 7,525,438 B2 | 4/2009 | Hyde et al. |
| D592,192 S | 5/2009 | Oliver |
| 7,528,724 B2 | 5/2009 | Horch |
| 7,528,728 B2 | 5/2009 | Oliver et al. |
| 7,541,843 B1 | 6/2009 | Hyde et al. |
| 7,561,866 B2 | 7/2009 | Oliver et al. |
| 7,589,618 B2 | 9/2009 | Diorio et al. |
| 7,592,897 B2 | 9/2009 | Diorio et al. |
| D605,641 S | 12/2009 | Oliver |
| D606,056 S | 12/2009 | Oliver |
| D606,057 S | 12/2009 | Oliver |
| 7,633,376 B2 | 12/2009 | Diorio et al. |
| 7,651,882 B1 | 1/2010 | Bockorick et al. |
| D610,576 S | 2/2010 | Oliver |
| 7,667,231 B2 | 2/2010 | Hyde et al. |
| 7,667,589 B2 | 2/2010 | Desmons et al. |
| D611,037 S | 3/2010 | Oliver |
| 7,679,957 B2 | 3/2010 | Ma et al. |
| D613,276 S | 4/2010 | Oliver |
| 7,696,882 B1 | 4/2010 | Rahimi et al. |
| 7,696,947 B2 | 4/2010 | Gallschuetz et al. |
| 7,714,593 B2 | 5/2010 | Varpula et al. |
| 7,715,236 B2 | 5/2010 | Hyde |
| 7,719,406 B2 | 5/2010 | Bajahr |
| D617,320 S | 6/2010 | Oliver |
| 7,733,227 B1 | 6/2010 | Pesavento et al. |
| D620,484 S | 7/2010 | Oliver |
| D620,928 S | 8/2010 | Oliver |
| 7,768,248 B1 | 8/2010 | Hyde |
| 7,768,406 B1 | 8/2010 | Peach et al. |
| 7,787,837 B2 | 8/2010 | Mikuteit |
| 7,804,411 B2 | 9/2010 | Copeland |
| 7,808,387 B1 | 10/2010 | Kuhn |
| 7,808,823 B2 | 10/2010 | Ma et al. |
| 7,812,729 B2 | 10/2010 | Copeland |
| 7,830,262 B1 | 11/2010 | Diorio et al. |
| 7,830,322 B1 | 11/2010 | Oliver et al. |
| 7,843,399 B2 | 11/2010 | Stobbe |
| 7,872,582 B1 | 1/2011 | Diorio |
| 7,884,725 B2 | 2/2011 | Kruest et al. |
| 7,907,899 B1 | 3/2011 | Oliver |
| 7,917,088 B2 | 3/2011 | Hyde et al. |
| 7,920,046 B1 | 4/2011 | Aiouaz et al. |
| 7,969,364 B2 | 6/2011 | Kriebel et al. |
| 7,973,643 B2 | 7/2011 | Hyde et al. |
| 7,973,645 B1 | 7/2011 | Moretti et al. |
| 7,973,661 B2 | 7/2011 | Copeland |
| 7,975,414 B2 | 7/2011 | Ritamäki et al. |

(56) References Cited

U.S. PATENT DOCUMENTS

| | | |
|---|---|---|
| 7,978,005 B1 | 7/2011 | Hyde et al. |
| 7,982,611 B1 | 7/2011 | Picasso et al. |
| 7,990,249 B1 | 8/2011 | Hyde et al. |
| 7,994,897 B2 | 8/2011 | Azevedo et al. |
| 7,999,675 B2 | 8/2011 | Diorio et al. |
| 8,028,923 B2 | 10/2011 | Shafran et al. |
| 8,044,774 B1 | 10/2011 | Diorio |
| 8,044,801 B1 | 10/2011 | Hyde et al. |
| 8,056,814 B2 | 11/2011 | Martin et al. |
| 8,063,740 B1 | 11/2011 | Diorio et al. |
| 8,072,327 B2 | 12/2011 | Enyedy et al. |
| 8,072,329 B1 | 12/2011 | Srinivas et al. |
| 8,072,332 B2 | 12/2011 | Forster |
| 8,077,013 B2 | 12/2011 | Cooper |
| 8,082,556 B1 | 12/2011 | Aiouaz et al. |
| 8,093,617 B2 | 1/2012 | Vicard et al. |
| 8,093,996 B2 | 1/2012 | Heurtier |
| 8,098,134 B2 | 1/2012 | Azevedo et al. |
| 8,115,590 B1 | 2/2012 | Diorio et al. |
| 8,115,597 B1 | 2/2012 | Oliver et al. |
| 8,115,632 B1 | 2/2012 | Rahimi et al. |
| 8,120,494 B1 | 2/2012 | Aiouaz et al. |
| 8,134,451 B1 | 3/2012 | Diorio |
| 8,154,385 B2 | 4/2012 | Aiouaz et al. |
| 8,174,367 B1 | 5/2012 | Diorio |
| 8,179,265 B2 | 5/2012 | Elizondo et al. |
| 8,188,867 B2 | 5/2012 | Rietzler |
| 8,188,927 B1 | 5/2012 | Koepp et al. |
| 8,193,912 B1 | 6/2012 | Gutnik et al. |
| 8,201,748 B2 | 6/2012 | Koepp et al. |
| 8,224,610 B2 | 7/2012 | Diorio et al. |
| 8,228,175 B1 | 7/2012 | Diorio et al. |
| 8,237,562 B1 | 8/2012 | Picasso et al. |
| 8,244,201 B2 | 8/2012 | Oliver et al. |
| 8,258,918 B1 | 9/2012 | Diorio et al. |
| 8,258,955 B1 | 9/2012 | Hyde et al. |
| 8,260,241 B1 | 9/2012 | Hyde |
| 8,279,045 B2 | 10/2012 | Diorio et al. |
| 8,294,582 B1 | 10/2012 | Humes et al. |
| 8,303,389 B2 | 11/2012 | Wilm |
| 8,305,764 B2 | 11/2012 | Rietzler |
| 8,325,014 B1 | 12/2012 | Sundstrom et al. |
| 8,325,042 B1 | 12/2012 | Hyde et al. |
| 8,326,256 B1 | 12/2012 | Kuhn |
| 8,334,751 B2 | 12/2012 | Azevedo et al. |
| 8,342,402 B2 | 1/2013 | Kriebel et al. |
| 8,344,857 B1 | 1/2013 | Oliver et al. |
| 8,350,665 B1 | 1/2013 | Sundstrom et al. |
| 8,350,702 B2 | 1/2013 | Copeland et al. |
| 8,354,917 B2 | 1/2013 | Diorio et al. |
| 8,390,425 B1 | 3/2013 | Cooper et al. |
| 8,390,430 B1 | 3/2013 | Sundstrom et al. |
| 8,390,431 B1 | 3/2013 | Diorio |
| 8,391,785 B2 | 3/2013 | Hyde et al. |
| 8,427,315 B2 | 4/2013 | Aiouaz et al. |
| 8,428,515 B1 | 4/2013 | Oliver |
| 8,446,258 B2 | 5/2013 | Diorio et al. |
| 8,448,874 B2 | 5/2013 | Koskelainen |
| 8,451,095 B2 | 5/2013 | Azevedo et al. |
| 8,451,119 B1 | 5/2013 | Rahimi et al. |
| 8,451,673 B1 | 5/2013 | Pesavento et al. |
| 8,471,708 B1 | 6/2013 | Diorio et al. |
| 8,471,773 B2 | 6/2013 | Vicard et al. |
| 8,511,569 B1 | 8/2013 | Koepp et al. |
| 8,536,075 B2 | 9/2013 | Leonard |
| 8,570,157 B1 | 10/2013 | Diorio et al. |
| 8,587,411 B1 | 11/2013 | Diorio |
| 8,593,257 B1 | 11/2013 | Diorio et al. |
| D695,278 S | 12/2013 | Koskelainen |
| 8,600,298 B1 | 12/2013 | Hyde et al. |
| 8,610,580 B2 | 12/2013 | Elizondo et al. |
| 8,614,506 B1 | 12/2013 | Fassett et al. |
| 8,616,459 B2 | 12/2013 | Sykko et al. |
| 8,661,652 B1 | 3/2014 | Koepp et al. |
| 8,665,074 B1 | 3/2014 | Diorio et al. |
| 8,669,872 B1 | 3/2014 | Stanford et al. |
| 8,669,874 B2 | 3/2014 | Kruest et al. |
| 8,680,973 B2 | 3/2014 | Kruest et al. |
| 8,698,629 B1 | 4/2014 | Stanford et al. |
| 8,717,145 B2 | 5/2014 | Ho et al. |
| D710,337 S | 8/2014 | Koskelainen |
| 8,796,865 B1 | 8/2014 | Fassett et al. |
| 8,810,376 B1 | 8/2014 | Picasso et al. |
| 8,814,054 B2 | 8/2014 | Brun et al. |
| 8,816,909 B2 | 8/2014 | Jiang et al. |
| 8,830,038 B1 | 9/2014 | Stanford et al. |
| 8,830,064 B1 | 9/2014 | Stanford et al. |
| 8,830,065 B1 | 9/2014 | Stanford et al. |
| 8,866,594 B1 | 10/2014 | Diorio et al. |
| 8,866,595 B1 | 10/2014 | Diorio et al. |
| 8,866,596 B1 | 10/2014 | Diorio et al. |
| 8,872,636 B1 | 10/2014 | Diorio et al. |
| 8,881,373 B1 | 11/2014 | Koepp et al. |
| 8,902,627 B1 | 12/2014 | Pesavento et al. |
| 8,907,795 B2 | 12/2014 | Soto et al. |
| 8,917,179 B2 | 12/2014 | Alicot et al. |
| 8,917,219 B2 | 12/2014 | Semar et al. |
| 8,952,792 B1 | 2/2015 | Srinivas et al. |
| 8,967,486 B2 | 3/2015 | Chandramowle et al. |
| 8,988,199 B1 | 3/2015 | Moretti et al. |
| 8,991,714 B2 | 3/2015 | Elizondo et al. |
| 8,998,097 B2 | 4/2015 | Launiainen |
| 9,000,835 B1 | 4/2015 | Peach et al. |
| D729,780 S | 5/2015 | Koskelainen et al. |
| 9,024,729 B1 | 5/2015 | Diorio et al. |
| 9,024,731 B1 | 5/2015 | Diorio et al. |
| 9,031,504 B1 | 5/2015 | Hyde et al. |
| 9,035,748 B2 | 5/2015 | Greefkes |
| 9,053,400 B2 | 6/2015 | Diorio et al. |
| 9,058,554 B2 | 6/2015 | Kervinen et al. |
| 9,064,196 B1 | 6/2015 | Gutnik et al. |
| 9,064,199 B2 | 6/2015 | Nitta |
| 9,070,066 B1 | 6/2015 | Oliver et al. |
| 9,076,049 B1 | 7/2015 | Moretti et al. |
| 9,087,281 B2 | 7/2015 | Maguire et al. |
| 9,087,282 B1 | 7/2015 | Hyde et al. |
| 9,104,923 B1 | 8/2015 | Stanford et al. |
| 9,111,283 B1 | 8/2015 | Diorio et al. |
| 9,129,168 B1 | 9/2015 | Diorio et al. |
| 9,129,169 B1 | 9/2015 | Diorio et al. |
| 9,135,476 B2 | 9/2015 | Virtanen |
| 9,142,881 B1 | 9/2015 | Oliver et al. |
| 9,165,170 B1 | 10/2015 | Gutnik et al. |
| 9,178,277 B1 | 11/2015 | Moretti et al. |
| 9,183,717 B1 | 11/2015 | Diorio et al. |
| 9,189,904 B1 | 11/2015 | Diorio et al. |
| 9,197,294 B2 | 11/2015 | Alicot et al. |
| 9,202,093 B2 | 12/2015 | Nummila et al. |
| 9,213,870 B1 | 12/2015 | Diorio et al. |
| 9,213,871 B1 | 12/2015 | Diorio et al. |
| 9,215,809 B2 | 12/2015 | Nieland et al. |
| 9,239,941 B1 | 1/2016 | Diorio |
| 9,247,634 B2 | 1/2016 | Kruest et al. |
| 9,253,876 B2 | 2/2016 | Elizondo et al. |
| 9,281,552 B2 | 3/2016 | Virtanen |
| 9,299,586 B1 | 3/2016 | West et al. |
| 9,305,195 B1 | 4/2016 | Diorio et al. |
| 9,317,799 B1 | 4/2016 | Koepp et al. |
| 9,325,053 B2 | 4/2016 | Virtanen et al. |
| 9,330,284 B1 | 5/2016 | Diorio |
| 9,342,775 B2 | 5/2016 | Forster |
| 9,349,032 B1 | 5/2016 | Diorio et al. |
| 9,349,090 B1 | 5/2016 | Srinivas et al. |
| 9,373,012 B2 | 6/2016 | Pesavento et al. |
| 9,390,603 B2 | 7/2016 | Li et al. |
| 9,405,945 B1 | 8/2016 | Diorio et al. |
| 9,430,683 B1 | 8/2016 | Hyde |
| 9,454,680 B1 | 9/2016 | Diorio |
| 9,460,380 B1 | 10/2016 | Koepp et al. |
| 9,471,816 B1 | 10/2016 | Hyde et al. |
| 9,489,611 B1 | 11/2016 | Diorio et al. |
| 9,495,631 B1 | 11/2016 | Koepp et al. |
| 9,501,675 B1 | 11/2016 | Diorio et al. |
| 9,501,736 B2 | 11/2016 | Elizondo et al. |

(56) References Cited

U.S. PATENT DOCUMENTS

| | | |
|---|---|---|
| 9,503,160 B1 | 11/2016 | Hyde |
| 9,542,636 B2 | 1/2017 | Buehler |
| 9,565,022 B1 | 2/2017 | Robshaw et al. |
| 9,582,690 B2 | 2/2017 | Rietzler |
| 9,589,224 B2 | 3/2017 | Patterson et al. |
| 9,607,191 B1 | 3/2017 | Peach et al. |
| 9,607,286 B1 | 3/2017 | Diorio |
| 9,626,619 B2 | 4/2017 | Kruest et al. |
| 9,633,302 B1 | 4/2017 | Heinrich |
| 9,646,186 B1 | 5/2017 | Hyde et al. |
| 9,652,643 B1 | 5/2017 | Pesavento et al. |
| 9,690,949 B1 | 6/2017 | Diorio et al. |
| 9,691,243 B1 | 6/2017 | Diorio et al. |
| 9,697,387 B1 | 7/2017 | Bowman et al. |
| 9,715,605 B1 | 7/2017 | Sundstrom et al. |
| 9,740,891 B1 | 8/2017 | Robshaw et al. |
| 9,747,542 B2 | 8/2017 | Elizondo et al. |
| 9,767,333 B1 | 9/2017 | Diorio et al. |
| 9,773,133 B2 | 9/2017 | Oliver et al. |
| 9,773,201 B2 | 9/2017 | Shafran et al. |
| 9,779,599 B2 | 10/2017 | Sharpy et al. |
| 9,792,472 B1 | 10/2017 | Robshaw et al. |
| 9,792,543 B2 | 10/2017 | Kuschewski et al. |
| 9,805,223 B1 | 10/2017 | Bowman et al. |
| 9,805,235 B2 | 10/2017 | Kruest et al. |
| 9,818,084 B1 | 11/2017 | Diorio et al. |
| 9,831,724 B2 | 11/2017 | Copeland et al. |
| 9,846,794 B2 | 12/2017 | Greefkes |
| 9,846,833 B1 | 12/2017 | Koepp et al. |
| 9,852,319 B1 | 12/2017 | Pesavento et al. |
| 9,875,438 B1 | 1/2018 | Diorio et al. |
| 9,881,186 B1 | 1/2018 | Sundstrom et al. |
| 9,881,473 B1 | 1/2018 | Diorio et al. |
| 9,886,658 B1 | 2/2018 | Stanford et al. |
| 9,887,843 B1 | 2/2018 | Robshaw et al. |
| 9,911,017 B2 | 3/2018 | Uhl et al. |
| 9,911,018 B1 | 3/2018 | Heinrich et al. |
| 9,916,483 B1 | 3/2018 | Robshaw et al. |
| 9,916,484 B2 | 3/2018 | Pesavento et al. |
| 9,922,215 B2 | 3/2018 | Huhtasalo et al. |
| 9,928,388 B1 | 3/2018 | Bowman et al. |
| 9,928,390 B1 | 3/2018 | Diorio et al. |
| 9,940,490 B1 | 4/2018 | Robshaw et al. |
| 9,953,198 B2 | 4/2018 | Kohler et al. |
| 9,954,278 B1 | 4/2018 | Moretti et al. |
| 9,959,435 B1 | 5/2018 | Diorio et al. |
| 9,959,494 B1 | 5/2018 | Shyamkumar et al. |
| 9,977,932 B2 | 5/2018 | Rietzler |
| 10,002,266 B1 | 6/2018 | Hyde et al. |
| 10,013,587 B1 | 7/2018 | Pesavento et al. |
| 10,037,444 B1 | 7/2018 | Sundstrom et al. |
| 10,043,046 B1 | 8/2018 | Robshaw et al. |
| 10,049,317 B1 | 8/2018 | Diorio et al. |
| 10,061,950 B1 | 8/2018 | Pesavento et al. |
| 10,068,167 B2 | 9/2018 | Huhtasalo |
| 10,084,597 B1 | 9/2018 | Robshaw et al. |
| 10,116,033 B1 | 10/2018 | Koepp et al. |
| 10,121,033 B1 | 11/2018 | Robshaw et al. |
| 10,133,894 B2 | 11/2018 | Kruest et al. |
| 10,146,969 B1 | 12/2018 | Diorio et al. |
| 10,169,625 B1 | 1/2019 | Diorio et al. |
| 10,186,127 B1 | 1/2019 | Diorio et al. |
| 10,204,245 B1 | 2/2019 | Diorio et al. |
| 10,204,246 B1 | 2/2019 | Maguire et al. |
| 10,235,545 B2 | 3/2019 | Kruest et al. |
| 10,262,167 B2 | 4/2019 | Nyalamadugu et al. |
| 10,311,351 B1 | 6/2019 | Diorio et al. |
| 10,311,353 B1 | 6/2019 | Diorio et al. |
| 10,325,125 B1 | 6/2019 | Pesavento et al. |
| 10,331,993 B1 | 6/2019 | Koepp et al. |
| 10,339,436 B2 | 7/2019 | Huhtasalo |
| 10,373,038 B1 | 8/2019 | Stanford |
| 10,373,115 B1 | 8/2019 | Diorio et al. |
| 10,402,710 B1 | 9/2019 | Diorio et al. |
| 10,417,085 B1 | 9/2019 | Diorio |
| 10,417,464 B2 | 9/2019 | Huhtasalo et al. |
| 10,430,623 B1 | 10/2019 | Pesavento et al. |
| 10,445,535 B1 | 10/2019 | Hyde et al. |
| D865,726 S | 11/2019 | Oliver |
| 10,474,851 B2 | 11/2019 | Greefkes |
| RE47,755 E | 12/2019 | Hyde et al. |
| 10,521,768 B1 | 12/2019 | Diorio et al. |
| 10,546,162 B1 | 1/2020 | Diorio |
| 10,558,828 B2 | 2/2020 | Martinez De Velasco Cortina et al. |
| 10,572,703 B1 | 2/2020 | Shyamkumar et al. |
| 10,572,789 B1 | 2/2020 | Stanford et al. |
| D879,077 S | 3/2020 | Oliver |
| 10,600,298 B1 | 3/2020 | Diorio et al. |
| 10,650,201 B1 | 5/2020 | Maguire et al. |
| 10,650,202 B1 | 5/2020 | Robshaw et al. |
| 10,650,346 B1 | 5/2020 | Pesavento et al. |
| 10,664,670 B1 | 5/2020 | Diorio et al. |
| D887,400 S | 6/2020 | Oliver |
| 10,679,019 B1 | 6/2020 | Thomas et al. |
| 10,679,115 B1 | 6/2020 | Huhtasalo |
| 10,699,178 B1 | 6/2020 | Diorio et al. |
| 10,713,453 B1 | 7/2020 | Diorio et al. |
| 10,713,549 B1 | 7/2020 | Peach et al. |
| 10,719,671 B1 | 7/2020 | Robshaw et al. |
| 10,720,700 B1 | 7/2020 | Moretti et al. |
| 10,733,395 B1 | 8/2020 | Diorio et al. |
| 10,740,574 B1 | 8/2020 | Stanford et al. |
| 10,776,198 B1 | 9/2020 | Diorio |
| 10,783,424 B1 | 9/2020 | Trivelpiece et al. |
| 10,790,160 B2 | 9/2020 | Singleton et al. |
| 10,819,319 B1 | 10/2020 | Hyde |
| 10,824,824 B1 | 11/2020 | Diorio |
| 10,846,583 B1 | 11/2020 | Koepp et al. |
| 10,860,819 B1 | 12/2020 | Pesavento et al. |
| 10,878,371 B1 | 12/2020 | Stanford et al. |
| 10,878,685 B1 | 12/2020 | Diorio et al. |
| 10,885,417 B1 | 1/2021 | Stanford et al. |
| 10,885,421 B1 | 1/2021 | Diorio et al. |
| 10,902,308 B2 | 1/2021 | Gire et al. |
| 10,916,114 B1 | 2/2021 | Diorio et al. |
| 10,929,734 B1 | 2/2021 | Hyde et al. |
| 10,936,929 B1 | 3/2021 | Diorio et al. |
| 10,956,693 B1 | 3/2021 | Shyamkumar et al. |
| 10,995,523 B2 | 5/2021 | Claeys et al. |
| 11,017,187 B1 | 5/2021 | Thomas et al. |
| 11,017,349 B1 | 5/2021 | Diorio et al. |
| 11,024,936 B1 | 6/2021 | Koepp et al. |
| 11,062,190 B1 | 7/2021 | Diorio et al. |
| 11,107,034 B1 | 8/2021 | Pesavento et al. |
| D929,975 S | 9/2021 | Abdul Rahman |
| 11,120,320 B1 | 9/2021 | Robshaw et al. |
| 11,132,589 B2 | 9/2021 | Chandramowle et al. |
| 11,188,803 B1 | 11/2021 | Patil et al. |
| 11,200,387 B1 | 12/2021 | Stanford et al. |
| 11,232,340 B1 | 1/2022 | Diorio et al. |
| 11,244,282 B1 | 2/2022 | Diorio et al. |
| 11,259,443 B1 | 2/2022 | T. Kunasekaran et al. |
| 11,282,357 B2 | 3/2022 | Claeys et al. |
| 11,288,564 B1 | 3/2022 | Koepp et al. |
| 11,300,467 B2 | 4/2022 | Boellaard et al. |
| 11,321,547 B1 | 5/2022 | Pesavento et al. |
| 11,341,343 B1 | 5/2022 | Diorio |
| 11,341,837 B1 | 5/2022 | Diorio et al. |
| 11,361,174 B1 | 6/2022 | Robshaw et al. |
| 11,403,505 B1 | 8/2022 | Diorio et al. |
| 11,423,278 B1 | 8/2022 | Koepp et al. |
| 11,443,160 B2* | 9/2022 | Trivelpiece ......... G06K 19/027 |
| 11,461,570 B1 | 10/2022 | Shyamkumar et al. |
| 11,481,591 B1 | 10/2022 | Peach et al. |
| 11,481,592 B1 | 10/2022 | Diorio et al. |
| 11,514,254 B1 | 11/2022 | Diorio |
| 11,514,255 B1 | 11/2022 | Thomas et al. |
| 11,519,200 B2 | 12/2022 | Claeys et al. |
| 2001/0034063 A1 | 10/2001 | Saunders et al. |
| 2002/0088154 A1 | 7/2002 | Sandt et al. |
| 2002/0097143 A1 | 7/2002 | Dalglish |
| 2003/0136503 A1 | 7/2003 | Green et al. |
| 2004/0026754 A1 | 2/2004 | Liu et al. |

(56) References Cited

U.S. PATENT DOCUMENTS

| | | |
|---|---|---|
| 2004/0125040 A1 | 7/2004 | Ferguson et al. |
| 2004/0192011 A1 | 9/2004 | Roesner |
| 2004/0195593 A1 | 10/2004 | Diorio et al. |
| 2004/0200061 A1 | 10/2004 | Coleman et al. |
| 2005/0001785 A1 | 1/2005 | Ferguson et al. |
| 2005/0052281 A1 | 3/2005 | Bann |
| 2005/0054293 A1 | 3/2005 | Bann |
| 2005/0057341 A1 | 3/2005 | Roesner |
| 2005/0058292 A1 | 3/2005 | Diorio et al. |
| 2005/0068179 A1 | 3/2005 | Roesner |
| 2005/0068180 A1 | 3/2005 | Miettinen et al. |
| 2005/0093690 A1 | 5/2005 | Miglionico |
| 2005/0099269 A1 | 5/2005 | Diorio et al. |
| 2005/0099270 A1 | 5/2005 | Diorio et al. |
| 2005/0140448 A1 | 6/2005 | Diorio et al. |
| 2005/0140449 A1 | 6/2005 | Diorio et al. |
| 2005/0162233 A1 | 7/2005 | Diorio et al. |
| 2005/0185460 A1 | 8/2005 | Roesner et al. |
| 2005/0200402 A1 | 9/2005 | Diorio et al. |
| 2005/0200415 A1 | 9/2005 | Diorio et al. |
| 2005/0200416 A1 | 9/2005 | Diorio et al. |
| 2005/0200417 A1 | 9/2005 | Diorio et al. |
| 2005/0212674 A1 | 9/2005 | Desmons et al. |
| 2005/0223286 A1 | 10/2005 | Forster |
| 2005/0225433 A1 | 10/2005 | Diorio et al. |
| 2005/0225434 A1 | 10/2005 | Diorio et al. |
| 2005/0225435 A1 | 10/2005 | Diorio et al. |
| 2005/0225436 A1 | 10/2005 | Diorio et al. |
| 2005/0225447 A1 | 10/2005 | Diorio et al. |
| 2005/0237157 A1 | 10/2005 | Cooper et al. |
| 2005/0237158 A1 | 10/2005 | Cooper et al. |
| 2005/0237159 A1 | 10/2005 | Cooper et al. |
| 2005/0237162 A1 | 10/2005 | Hyde et al. |
| 2005/0237843 A1 | 10/2005 | Hyde |
| 2005/0237844 A1 | 10/2005 | Hyde |
| 2005/0240369 A1 | 10/2005 | Diorio et al. |
| 2005/0240370 A1 | 10/2005 | Diorio et al. |
| 2005/0240739 A1 | 10/2005 | Pesavento |
| 2005/0269408 A1 | 12/2005 | Esterberg et al. |
| 2005/0270141 A1 | 12/2005 | Dalglish |
| 2005/0270185 A1 | 12/2005 | Esterberg |
| 2005/0270189 A1 | 12/2005 | Kaplan et al. |
| 2005/0275533 A1 | 12/2005 | Hanhikorpi et al. |
| 2005/0280505 A1 | 12/2005 | Humes et al. |
| 2005/0280506 A1 | 12/2005 | Lobanov et al. |
| 2005/0280507 A1 | 12/2005 | Diorio et al. |
| 2005/0282495 A1 | 12/2005 | Forster |
| 2006/0033622 A1 | 2/2006 | Hyde et al. |
| 2006/0043198 A1 | 3/2006 | Forster |
| 2006/0044769 A1 | 3/2006 | Forster et al. |
| 2006/0049917 A1 | 3/2006 | Hyde et al. |
| 2006/0049928 A1 | 3/2006 | Ening |
| 2006/0055620 A1 | 3/2006 | Oliver et al. |
| 2006/0063323 A1 | 3/2006 | Munn |
| 2006/0071758 A1 | 4/2006 | Cooper et al. |
| 2006/0071759 A1 | 4/2006 | Cooper et al. |
| 2006/0071793 A1 | 4/2006 | Pesavento |
| 2006/0071796 A1 | 4/2006 | Korzeniewski |
| 2006/0082442 A1 | 4/2006 | Sundstrom |
| 2006/0086810 A1 | 4/2006 | Diorio et al. |
| 2006/0098765 A1 | 5/2006 | Thomas et al. |
| 2006/0125505 A1 | 6/2006 | Glidden et al. |
| 2006/0125506 A1 | 6/2006 | Hara et al. |
| 2006/0125507 A1 | 6/2006 | Hyde et al. |
| 2006/0125508 A1 | 6/2006 | Glidden et al. |
| 2006/0125641 A1 | 6/2006 | Forster |
| 2006/0133140 A1 | 6/2006 | Gutnik et al. |
| 2006/0133175 A1 | 6/2006 | Gutnik et al. |
| 2006/0145710 A1 | 7/2006 | Puleston et al. |
| 2006/0145855 A1 | 7/2006 | Diorio et al. |
| 2006/0145861 A1 | 7/2006 | Forster et al. |
| 2006/0145864 A1 | 7/2006 | Jacober et al. |
| 2006/0163370 A1 | 7/2006 | Diorio et al. |
| 2006/0164214 A1 | 7/2006 | Bajahr |
| 2006/0186960 A1 | 8/2006 | Diorio et al. |
| 2006/0187031 A1 | 8/2006 | Moretti et al. |
| 2006/0187094 A1 | 8/2006 | Kaplan et al. |
| 2006/0197668 A1 | 9/2006 | Oliver et al. |
| 2006/0199551 A1 | 9/2006 | Thomas et al. |
| 2006/0202705 A1 | 9/2006 | Forster |
| 2006/0202831 A1 | 9/2006 | Horch |
| 2006/0206277 A1 | 9/2006 | Horch |
| 2006/0211386 A1 | 9/2006 | Thomas et al. |
| 2006/0220639 A1 | 10/2006 | Hyde |
| 2006/0220865 A1 | 10/2006 | Babine et al. |
| 2006/0221715 A1 | 10/2006 | Ma et al. |
| 2006/0224647 A1 | 10/2006 | Gutnik |
| 2006/0226982 A1 | 10/2006 | Forster |
| 2006/0226983 A1 | 10/2006 | Forster et al. |
| 2006/0236203 A1 | 10/2006 | Diorio et al. |
| 2006/0238345 A1 | 10/2006 | Ferguson et al. |
| 2006/0244598 A1 | 11/2006 | Hyde et al. |
| 2006/0250245 A1 | 11/2006 | Forster |
| 2006/0250246 A1 | 11/2006 | Forster |
| 2006/0252182 A1 | 11/2006 | Wang et al. |
| 2006/0261952 A1 | 11/2006 | Kavounas et al. |
| 2006/0261953 A1 | 11/2006 | Diorio et al. |
| 2006/0261954 A1 | 11/2006 | Dietrich et al. |
| 2006/0261955 A1 | 11/2006 | Humes et al. |
| 2006/0261956 A1 | 11/2006 | Sundstrom et al. |
| 2006/0271328 A1 | 11/2006 | Forster |
| 2006/0273170 A1 | 12/2006 | Forster et al. |
| 2007/0001856 A1 | 1/2007 | Diorio et al. |
| 2007/0008238 A1 | 1/2007 | Liu et al. |
| 2007/0024446 A1 | 2/2007 | Hyde et al. |
| 2007/0035466 A1 | 2/2007 | Coleman et al. |
| 2007/0039687 A1 | 2/2007 | Hamilton et al. |
| 2007/0046432 A1 | 3/2007 | Aiouaz et al. |
| 2007/0052613 A1 | 3/2007 | Gallschuetz et al. |
| 2007/0060075 A1 | 3/2007 | Mikuteit |
| 2007/0085685 A1 | 4/2007 | Phaneuf et al. |
| 2007/0109129 A1 | 5/2007 | Sundstrom et al. |
| 2007/0126584 A1 | 6/2007 | Hyde et al. |
| 2007/0136583 A1 | 6/2007 | Diorio et al. |
| 2007/0136584 A1 | 6/2007 | Diorio et al. |
| 2007/0136585 A1 | 6/2007 | Diorio et al. |
| 2007/0141760 A1 | 6/2007 | Ferguson et al. |
| 2007/0144662 A1 | 6/2007 | Armijo et al. |
| 2007/0152073 A1 | 7/2007 | Esterberg |
| 2007/0156281 A1 | 7/2007 | Leung et al. |
| 2007/0164851 A1 | 7/2007 | Cooper |
| 2007/0171129 A1 | 7/2007 | Coleman et al. |
| 2007/0172966 A1 | 7/2007 | Hyde et al. |
| 2007/0177738 A1 | 8/2007 | Diorio et al. |
| 2007/0180009 A1 | 8/2007 | Gutnik |
| 2007/0216533 A1 | 9/2007 | Hyde et al. |
| 2007/0218571 A1 | 9/2007 | Stoughton et al. |
| 2007/0220737 A1 | 9/2007 | Stoughton et al. |
| 2007/0221737 A2 | 9/2007 | Diorio et al. |
| 2007/0236331 A1 | 10/2007 | Thompson et al. |
| 2007/0236335 A1 | 10/2007 | Aiouaz et al. |
| 2007/0241762 A1 | 10/2007 | Varpula et al. |
| 2007/0296590 A1 | 12/2007 | Diorio et al. |
| 2007/0296603 A1 | 12/2007 | Diorio et al. |
| 2008/0006702 A2 | 1/2008 | Diorio et al. |
| 2008/0018489 A1 | 1/2008 | Kruest et al. |
| 2008/0024273 A1 | 1/2008 | Kruest et al. |
| 2008/0030342 A1 | 2/2008 | Elizondo et al. |
| 2008/0046492 A1 | 2/2008 | Sundstrom |
| 2008/0048833 A1 | 2/2008 | Oliver |
| 2008/0048867 A1 | 2/2008 | Oliver et al. |
| 2008/0084275 A1 | 4/2008 | Azevedo et al. |
| 2008/0094214 A1 | 4/2008 | Azevedo et al. |
| 2008/0136602 A1 | 6/2008 | Ma et al. |
| 2008/0180217 A1 | 7/2008 | Isabell |
| 2008/0180255 A1 | 7/2008 | Isabell |
| 2008/0197978 A1 | 8/2008 | Diorio et al. |
| 2008/0197979 A1 | 8/2008 | Enyedy et al. |
| 2008/0204195 A1 | 8/2008 | Diorio et al. |
| 2008/0232883 A1 | 9/2008 | Klein et al. |
| 2008/0232894 A1 | 9/2008 | Neuhard |
| 2008/0258878 A1 | 10/2008 | Dietrich et al. |
| 2008/0258916 A1 | 10/2008 | Diorio et al. |
| 2008/0266098 A1 | 10/2008 | Aiouaz et al. |

(56) References Cited

U.S. PATENT DOCUMENTS

| | | |
|---|---|---|
| 2008/0297421 A1 | 12/2008 | Kriebel et al. |
| 2008/0314990 A1 | 12/2008 | Rietzler |
| 2008/0315992 A1 | 12/2008 | Forster |
| 2009/0002132 A1 | 1/2009 | Diorio et al. |
| 2009/0015382 A1 | 1/2009 | Greefkes |
| 2009/0027173 A1 | 1/2009 | Forster |
| 2009/0033495 A1 | 2/2009 | Abraham et al. |
| 2009/0038735 A1 | 2/2009 | Kian |
| 2009/0091424 A1 | 4/2009 | Rietzler |
| 2009/0123704 A1 | 5/2009 | Shafran et al. |
| 2009/0146785 A1 | 6/2009 | Forster |
| 2009/0184824 A1 | 7/2009 | Forster |
| 2009/0189770 A1 | 7/2009 | Wirrig et al. |
| 2009/0194588 A1 | 8/2009 | Blanchard et al. |
| 2009/0200066 A1 | 8/2009 | Vicard et al. |
| 2009/0212919 A1 | 8/2009 | Selgrath et al. |
| 2009/0237220 A1 | 9/2009 | Oliver et al. |
| 2009/0251293 A1 | 10/2009 | Azevedo et al. |
| 2010/0032900 A1 | 2/2010 | Wilm |
| 2010/0033297 A1 | 2/2010 | Patovirta |
| 2010/0050487 A1 | 3/2010 | Weightman et al. |
| 2010/0060456 A1 | 3/2010 | Forster |
| 2010/0060459 A1 | 3/2010 | Stole et al. |
| 2010/0079286 A1 | 4/2010 | Phaneuf |
| 2010/0079287 A1 | 4/2010 | Forster et al. |
| 2010/0079290 A1 | 4/2010 | Phaneuf |
| 2010/0126000 A1 | 5/2010 | Forster |
| 2010/0155492 A1 | 6/2010 | Forster |
| 2010/0156640 A1 | 6/2010 | Forster |
| 2010/0182129 A1 | 7/2010 | Hyde et al. |
| 2010/0226107 A1 | 9/2010 | Rietzler |
| 2010/0230500 A1 | 9/2010 | Wilkinson |
| 2010/0245182 A1 | 9/2010 | Vicard et al. |
| 2010/0259392 A1 | 10/2010 | Chamandy et al. |
| 2010/0270382 A1 | 10/2010 | Koepp et al. |
| 2011/0000970 A1 | 1/2011 | Abraham |
| 2011/0062236 A1 | 3/2011 | Kriebel et al. |
| 2011/0114734 A1 | 5/2011 | Tiedmann et al. |
| 2011/0121082 A1 | 5/2011 | Phaneuf |
| 2011/0121972 A1 | 5/2011 | Phaneuf et al. |
| 2011/0155811 A1 | 6/2011 | Rietzler |
| 2011/0155813 A1 | 6/2011 | Forster |
| 2011/0160548 A1 | 6/2011 | Forster |
| 2011/0163849 A1 | 7/2011 | Kruest et al. |
| 2011/0163879 A1 | 7/2011 | Kruest et al. |
| 2011/0175735 A1 | 7/2011 | Forster |
| 2011/0185607 A1 | 8/2011 | Forster et al. |
| 2011/0253794 A1 | 10/2011 | Koskelainen |
| 2011/0256357 A1 | 10/2011 | Forster |
| 2011/0267254 A1 | 11/2011 | Semar et al. |
| 2011/0285511 A1 | 11/2011 | Maguire et al. |
| 2011/0289023 A1 | 11/2011 | Forster et al. |
| 2011/0289647 A1 | 12/2011 | Chiao et al. |
| 2011/0303751 A1 | 12/2011 | Lai et al. |
| 2011/0307309 A1 | 12/2011 | Forster et al. |
| 2012/0019358 A1 | 1/2012 | Azevedo et al. |
| 2012/0038461 A1 | 2/2012 | Forster |
| 2012/0050011 A1 | 3/2012 | Forster |
| 2012/0061473 A1 | 3/2012 | Forster et al. |
| 2012/0118975 A1 | 5/2012 | Forster |
| 2012/0154121 A1 | 6/2012 | Azevedo et al. |
| 2012/0164405 A1 | 6/2012 | Webb et al. |
| 2012/0173440 A1 | 7/2012 | Dehlinger et al. |
| 2012/0175621 A1 | 7/2012 | Backlund et al. |
| 2012/0182147 A1 | 7/2012 | Forster |
| 2012/0234921 A1 | 9/2012 | Tiedmann et al. |
| 2012/0235870 A1 | 9/2012 | Forster |
| 2012/0261477 A1 | 10/2012 | Elizondo et al. |
| 2012/0274448 A1 | 11/2012 | Marcus et al. |
| 2012/0279100 A1 | 11/2012 | Burout et al. |
| 2012/0290440 A1 | 11/2012 | Hoffman et al. |
| 2012/0292399 A1 | 11/2012 | Launiainen |
| 2013/0059534 A1 | 3/2013 | Sobalvarro et al. |
| 2013/0075481 A1 | 3/2013 | Raymond et al. |
| 2013/0082113 A1 | 4/2013 | Cooper |
| 2013/0092742 A1 | 4/2013 | Brun et al. |
| 2013/0105586 A1 | 5/2013 | Sykkö et al. |
| 2013/0107042 A1 | 5/2013 | Forster |
| 2013/0113627 A1 | 5/2013 | Tiedmann |
| 2013/0135080 A1 | 5/2013 | Virtanen |
| 2013/0135104 A1 | 5/2013 | Nikkanen |
| 2013/0141222 A1 | 6/2013 | Garcia |
| 2013/0161382 A1 | 6/2013 | Bauer et al. |
| 2013/0163640 A1 | 6/2013 | Aiouaz et al. |
| 2013/0206846 A1 | 8/2013 | Wilkinson |
| 2013/0265139 A1 | 10/2013 | Nummila et al. |
| 2013/0277432 A1 | 10/2013 | Katworapattra et al. |
| 2013/0285795 A1 | 10/2013 | Virtanen et al. |
| 2013/0291375 A1 | 11/2013 | Virtanen et al. |
| 2014/0070010 A1 | 3/2014 | Diorio et al. |
| 2014/0070923 A1 | 3/2014 | Forster et al. |
| 2014/0073071 A1 | 3/2014 | Diorio et al. |
| 2014/0084460 A1 | 3/2014 | Nieland et al. |
| 2014/0103119 A1 | 4/2014 | Elizondo et al. |
| 2014/0111314 A1 | 4/2014 | Rietzler |
| 2014/0144992 A1 | 5/2014 | Diorio et al. |
| 2014/0158777 A1 | 6/2014 | Gladstone |
| 2014/0191043 A1 | 7/2014 | Forster |
| 2014/0209694 A1 | 7/2014 | Forster |
| 2014/0263655 A1 | 9/2014 | Forster |
| 2014/0263659 A1 | 9/2014 | Kervinen et al. |
| 2014/0266633 A1 | 9/2014 | Marcus |
| 2014/0317909 A1 | 10/2014 | Virtanen |
| 2015/0022323 A1 | 1/2015 | Kruest et al. |
| 2015/0024523 A1 | 1/2015 | Virtanen |
| 2015/0032569 A1 | 1/2015 | Stromberg |
| 2015/0048170 A1 | 2/2015 | Forster |
| 2015/0076238 A1 | 3/2015 | Koskelainen |
| 2015/0107092 A1 | 4/2015 | Bashan et al. |
| 2015/0115038 A1 | 4/2015 | Kuschewski et al. |
| 2015/0181696 A1 | 6/2015 | Elizondo et al. |
| 2015/0227832 A1 | 8/2015 | Diorio et al. |
| 2015/0235062 A1 | 8/2015 | Greefkes |
| 2015/0248604 A1 | 9/2015 | Diorio et al. |
| 2015/0262053 A1 | 9/2015 | Buehler |
| 2015/0269474 A1 | 9/2015 | Finn et al. |
| 2015/0328871 A1 | 11/2015 | de Castro |
| 2015/0351689 A1 | 12/2015 | Adams et al. |
| 2015/0353292 A1 | 12/2015 | Roth |
| 2015/0356395 A1 | 12/2015 | Haring et al. |
| 2016/0019452 A1 | 1/2016 | Forster |
| 2016/0027022 A1 | 1/2016 | Benoit et al. |
| 2016/0034728 A1 | 2/2016 | Oliver et al. |
| 2016/0042206 A1 | 2/2016 | Pesavento |
| 2016/0137396 A1 | 5/2016 | Brownfield |
| 2016/0154618 A1 | 6/2016 | Duckett |
| 2016/0157348 A1 | 6/2016 | Elizondo et al. |
| 2016/0162776 A1 | 6/2016 | Kruest et al. |
| 2016/0172742 A1 | 6/2016 | Forster |
| 2016/0172743 A1 | 6/2016 | Forster |
| 2016/0189020 A1 | 6/2016 | Duckett et al. |
| 2016/0203395 A1 | 7/2016 | Huhtasalo |
| 2016/0214422 A1 | 7/2016 | Deyoung et al. |
| 2016/0233188 A1 | 8/2016 | Kriebel et al. |
| 2016/0253732 A1 | 9/2016 | Brown |
| 2016/0321479 A1 | 11/2016 | Uhl et al. |
| 2016/0336198 A1 | 11/2016 | Singleton et al. |
| 2016/0342821 A1 | 11/2016 | Nyalamadugu et al. |
| 2016/0342883 A1 | 11/2016 | Huhtasalo |
| 2016/0364589 A1 | 12/2016 | Roth |
| 2016/0365644 A1 | 12/2016 | Finn et al. |
| 2017/0011664 A1 | 1/2017 | Forster et al. |
| 2017/0068882 A1 | 3/2017 | Elizondo et al. |
| 2017/0091498 A1 | 3/2017 | Forster et al. |
| 2017/0098393 A1 | 4/2017 | Duckett et al. |
| 2017/0124363 A1 | 5/2017 | Rietzler |
| 2017/0161601 A1 | 6/2017 | Sevaux |
| 2017/0169263 A1 | 6/2017 | Kohler et al. |
| 2017/0235982 A1 | 8/2017 | Kruest et al. |
| 2017/0243032 A1 | 8/2017 | Pesavento et al. |
| 2017/0286819 A9 | 10/2017 | Huhtasalo |
| 2017/0305068 A1 | 10/2017 | Caldwell et al. |
| 2017/0364716 A1 | 12/2017 | Huhtasalo et al. |
| 2018/0032774 A1 | 2/2018 | Kruest et al. |

(56) References Cited

U.S. PATENT DOCUMENTS

| | | |
|---|---|---|
| 2018/0096176 A1 | 4/2018 | Greefkes |
| 2018/0101759 A1 | 4/2018 | Forster |
| 2018/0121690 A1 | 5/2018 | Forster et al. |
| 2018/0123220 A1 | 5/2018 | Forster |
| 2018/0137314 A1 | 5/2018 | Roth |
| 2018/0157873 A1 | 6/2018 | Roth |
| 2018/0157874 A1 | 6/2018 | Huhtasalo et al. |
| 2018/0157879 A1 | 6/2018 | Forster |
| 2018/0165485 A1 | 6/2018 | Martinez De Velasco Cortina et al. |
| 2018/0268175 A1 | 9/2018 | Rietzler |
| 2018/0336383 A1 | 11/2018 | Roth |
| 2019/0026616 A1 | 1/2019 | Bourque et al. |
| 2019/0057289 A1 | 2/2019 | Bauer et al. |
| 2019/0087705 A1 | 3/2019 | Bourque et al. |
| 2019/0147773 A1 | 5/2019 | Cockerell |
| 2019/0205724 A1 | 7/2019 | Roth |
| 2019/0220724 A1 | 7/2019 | Huhtasalo |
| 2019/0244072 A1 | 8/2019 | Forster |
| 2019/0251411 A1 | 8/2019 | Gire et al. |
| 2019/0266464 A1 | 8/2019 | Forster |
| 2019/0389613 A1 | 12/2019 | Colarossi |
| 2019/0391560 A1 | 12/2019 | Arene et al. |
| 2020/0006840 A1 | 1/2020 | Forster |
| 2020/0051463 A1 | 2/2020 | Melo |
| 2020/0126454 A1 | 4/2020 | Sevaux |
| 2020/0134408 A1 | 4/2020 | Law |
| 2020/0151401 A1 | 5/2020 | Dyche et al. |
| 2020/0160142 A1 | 5/2020 | Roth |
| 2020/0193260 A1 | 6/2020 | Forster |
| 2020/0193261 A1 | 6/2020 | de Backer |
| 2020/0193455 A1 | 6/2020 | Hoffman et al. |
| 2020/0202294 A1 | 6/2020 | Duckett et al. |
| 2020/0207116 A1 | 7/2020 | Raphael et al. |
| 2020/0249109 A1 | 8/2020 | Singleton et al. |
| 2020/0265446 A1 | 8/2020 | Vargas |
| 2020/0335475 A1 | 10/2020 | Rolland et al. |
| 2020/0381829 A1 | 12/2020 | Andia Vera et al. |
| 2020/0394697 A1 | 12/2020 | Paolella et al. |
| 2021/0215562 A1 | 7/2021 | Boellaard et al. |
| 2021/0241063 A1 | 8/2021 | Thirappa et al. |
| 2021/0312471 A1 | 10/2021 | Iyer |
| 2022/0012439 A1 | 1/2022 | Duckett et al. |
| 2022/0171951 A1 | 6/2022 | Vargas et al. |
| 2022/0180014 A1 | 6/2022 | Barr et al. |
| 2022/0196500 A1 | 6/2022 | Singleton et al. |
| 2022/0215353 A1 | 7/2022 | Duckett |
| 2022/0230134 A1 | 7/2022 | Pursell et al. |
| 2022/0269919 A1 | 8/2022 | de Backer |
| 2022/0277152 A1 | 9/2022 | Forster |
| 2022/0284253 A1 | 9/2022 | Garcia et al. |
| 2022/0318532 A1 | 10/2022 | Roth |
| 2022/0358337 A1 | 11/2022 | Diorio et al. |
| 2022/0358339 A1 | 11/2022 | Forster et al. |
| 2022/0358340 A1 | 11/2022 | Sowle et al. |
| 2022/0391654 A1 | 12/2022 | Forster |
| 2022/0398424 A1 | 12/2022 | Forster |
| 2022/0398425 A1 | 12/2022 | Roth |
| 2022/0414356 A1 | 12/2022 | Roth |
| 2022/0414411 A1 | 12/2022 | Forster |

FOREIGN PATENT DOCUMENTS

| | | |
|---|---|---|
| CN | 103080392 A | 5/2013 |
| CN | 110326100 A | 10/2019 |
| CN | 110945716 A | 3/2020 |
| DE | 102006051379 A1 | 4/2008 |
| DE | 102007001411 A1 | 7/2008 |
| EP | 1739597 A2 | 1/2007 |
| EP | 1826711 A1 | 8/2007 |
| EP | 2057687 A1 | 5/2009 |
| EP | 2158604 A2 | 3/2010 |
| EP | 2585628 A1 | 5/2013 |
| EP | 3319168 A1 | 5/2018 |
| EP | 3574521 A1 | 12/2019 |
| EP | 3662534 A1 | 6/2020 |
| EP | 3923195 A1 | 12/2021 |
| FR | 2905518 A1 | 3/2008 |
| FR | 2917895 A1 | 12/2008 |
| FR | 2961947 A1 | 12/2011 |
| FR | 3058579 A1 | 5/2018 |
| FR | 3062515 A1 | 8/2018 |
| FR | 3069962 A1 | 2/2019 |
| FR | 3078980 A1 | 9/2019 |
| FR | 3103043 A1 | 5/2021 |
| FR | 3103044 A1 | 5/2021 |
| FR | 3103630 A1 | 5/2021 |
| JP | 2004118625 A | 4/2004 |
| JP | 2010502030 A | 1/2010 |
| JP | 2010530630 A | 9/2010 |
| JP | 5059110 B2 | 10/2012 |
| JP | 2013529807 A | 7/2013 |
| JP | 5405457 B2 | 2/2014 |
| JP | 5815692 B2 | 11/2015 |
| JP | 2020505714 A | 2/2020 |
| WO | 2002045011 A1 | 6/2002 |
| WO | 2007104634 A1 | 9/2007 |
| WO | 2008025889 A1 | 3/2008 |
| WO | 2009004243 A2 | 1/2009 |
| WO | 2011161336 A1 | 12/2011 |
| WO | 2018138437 A1 | 8/2018 |
| WO | 2019025683 A1 | 2/2019 |
| WO | 2019175509 A1 | 9/2019 |

OTHER PUBLICATIONS

Extended European Search Report for European Patent Application No. 20 196 210.7, dated Feb. 5, 2021 (21 pages).

* cited by examiner (Side View)

(Top View)

(Top View)

SYSTEMS AND METHODS FOR LASER TUNING AND ATTACHING RFID TAGS TO PRODUCTS

CROSS-REFERENCE TO RELATED APPLICATIONS

The present application is a continuation of U.S. Non-provisional patent application Ser. No. 17/025,890, filed Sep. 18, 2020, which claims priority to U.S. Non-Provisional patent application Ser. No. 16/685,508, filed on Nov. 15, 2019, U.S. Non-Provisional patent application Ser. No. 16/685,584, filed on Nov. 15, 2019, and to U.S. Provisional Patent Application Ser. No. 62/902,355 filed on Sep. 18, 2019, the contents of each are incorporated by reference herein in their entireties.

BACKGROUND

Statement of the Technical Field

The present disclosure relates generally to tags (e.g., Radio Frequency Identification ("RFID")). More particularly, the present disclosure relates to implementing systems and methods for laser tuning and attaching RFID tags to products (e.g., textile products, boxes, etc.).

Description of the Related Art

There are many RFID tags known in the art. Once such RFID tag comprises a Visual Source Tag ("VST") Item Level Intelligence ("ILI") hard tag made by Sensormatic Electronics, LLC of Florida. The VST ILI hard tag consist of an RFID tag attached to Polyethylene Terephthalate ("PET") substrate and encased in an Acrylonitrile Butadiene Styrene ("ABS") plastic housing. The VST ILI hard tag is hard to defeat by malicious individuals (e.g., thieves). However, the VST ILI hard tag is difficult to remove at Point Of Sale ("POS") systems. In order to address these drawbacks of the VST ILI hard tag, swing tickets have been created that contain RFID tags on PET and imbedded in paper. The problem with the swing ticket configuration is that the swing ticket be easily removed from the retail item without damaging the same, which results in less security from theft.

Therefore, it makes sense to insert an RFID tag directly into the retail item that the RFID tag is intended to protect. One such solution involves incorporating the RFID tag in a thread that can be sewn into cloth. Theoretically, this is an inexpensive solution that uses standard sewing techniques. However, the standard sewing techniques tend to damage the RFID tag causing failure rates of 1-20% that are not acceptable. Accordingly, a special machine has been employed required to install the RFID tag thread into cloth. In order to have physical strength, a wire is coated by a thick coating. Consequently, the RFID tag thread is able to be felt by someone touching the cloth and can be seen after the cloth has been ironed. In addition, this solution is relatively expensive.

Another solution includes placing RFID tags on care or brand labels of retail items. This label based solution has several drawbacks. For example, the care/brand labels have known locations and are easy to remove from the retail items using a cutting tool (e.g., scissors). Also, care/brand labels are usually small so the RFID tags antennas need to be meandered which reduces the RFID tag performance. If the care/brand label material has thickness or stiffness, then the care/brand labels will cause irritation to the individuals wearing the item. Finally, if the retail item is a garment for the upper body, then an individual might try to steal the garment by putting it on in a fitting room and wearing it out of the retail store without paying for the same. The back of a person's neck is a difficult location to try and read an RFID tag from an exit gate. Tag detection is much better if the RFID tag is installed in a seam of the garment. By placing the RFID tag in the seam of the garment may also cause additional issues, for example, being visible when a user wears the garment.

Further, other issues arise when a RFID tag is attached or placed within the garment, as the material and location of the garment itself, and/or a position of the RFID tag/garment on a person's body, may interfere with the communications of the RFID tag. For example, in some cases, the RFID tag may be placed and/or attached to a garment containing a substantial amount of interfering type material (e.g., a metallic jacket containing metal-coated plastics). As discussed above, in another example, the RFID tag may be attached or placed within the garment at a location near the thresholds of the readers (e.g., near a neck area of a top or near the ankle area of pants).

In view of these issues outlined above, there is a need for improvements in installing RFID tags in and/or onto products.

SUMMARY

The present disclosure concerns implementing systems and methods for laser tuning and attaching RFID tags to products. In some cases, the methods can be performed while the item(s) or product(s) is(are) being fabricated. The disclosed systems and methods for installing an RFID tag in and/or onto an item or product may address one or more of the above-noted issues of current solutions by installing the RFID tag without sewing and with RF characteristics that may be customized for different item or product locations, and/or customized for different types of items or products.

Aspects of the present disclosure relate to methods and systems for laser turning and attaching RFID tags to products. Such methods and systems may include a memory and a processor coupled to the memory. The methods and systems may include determining a characteristic of a conductive trace on a substrate to be incorporated into an item to configure a tag performance in view of at least one of a dielectric property or a tuning property of the item. The methods and systems may further include a laser to alter the conductive trace on the substrate to have the characteristic to define an antenna for the tag. The methods and systems may further include an attaching device configured to attach a communications enabled device to the substrate so as to form an electrical connection between the communications enabled device and the antenna to form the tag.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The novel features believed to be characteristic of implementations of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further features and advances thereof, will be best understood by reference to the following detailed description of illustrative implementations of the disclosure when read in conjunction with the accompanying drawings, wherein:

DETAILED DESCRIPTION

Figure 1:
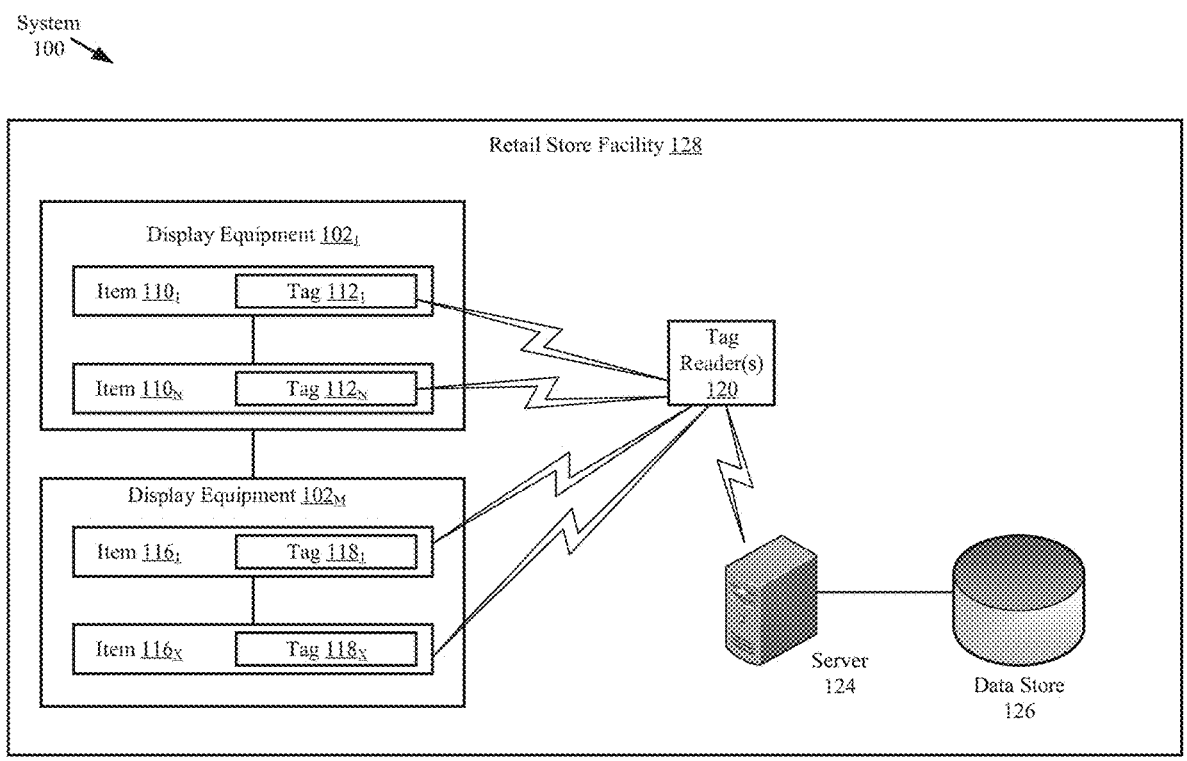
FIG. 1 is an illustration of an illustrative architecture for a system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The terms "memory," "memory device," "data store," "data storage facility" and the like each refer to a non-transitory device on which computer-readable data, programming instructions (e.g., instructions 222 of FIG. 2, 322 of FIGS. 3 and 1120 of FIG. 11) or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The present document concerns various solutions to address the drawbacks of conventional RFID tag solutions such as those disclosed in the background section of this document. One solution comprises a tag formed of a relatively thin, narrow, machine washable substrate on which electronic components are mounted or otherwise disposed. The substrate may also be lightweight and recyclable. The substrate may be any soft and/or flexible material which may include, but is not limited to, a fabric, a plastic, and/or a paper (e.g., Thermoplastic Polyurethane ("TPU"), silk, cloth/textile, polyester (e.g., Polyethylene terephthalate, "PET") and the like. The substrate may also be coated with a layer of a flexible fluid resistive material for protecting the same from damage due to fluid exposure. The layer of flexible fluid resistive material may be applied to both sides of the substrate. The flexible fluid resistive material can include, but is not limited to, a TPU material and/or a PET material. The flexible fluid resistive material may be a colored TPU which matches the color of items to which the tags are to be coupled. The flexible fluid resistive material may also be heat sensitive, whereby, as described below, one or more characteristics of the material (e.g., color, pattern, adhesion, etc.) may change when heat is applied to the flexible fluid resistive material. The electronic components can include, but are not limited to, a communication-enabled device having at least one antenna (e.g., an RFID enabled device). The tag is designed to be relatively thin so that it is hard to feel when incorporated into an item, but thick enough to withstand a certain number (e.g., 2-5) of wash cycles.

A plurality of tags may be fabricated using a single piece of narrow substrate (e.g., a ribbon). In this case, the electronic components may be coupled to the narrow substrate so as to be separated from each other with equal or unequal amounts of substrate. A coating may be applied to the narrow substrate with the electronic components coupled thereto. The narrow substrate may then be rolled or wound onto a reel. The reel is then inserted into a machine (e.g., a ribbon dispensing machine) for incorporating tags with item(s). The spacing between the electronic components is selected so that the machine is able to cut the narrow substrate while installing the tags in or incorporating the tags with items without any damage thereto. The thickness of the narrow substrate is selected so that the machine is able to hold the narrow substrate under tension on the reel while installing the tags in the items.

In some scenarios, the machine installation process involves: turning the reel by an amount that allows a portion of the narrow substrate that includes an electronic component to be rolled onto an item; cutting the narrow substrate at an end thereof so that a tag is placed or otherwise disposed on the item; and using a conventional sewing machine to sew at least one end of the tag onto the item. Notably, the tag is unable to be felt when sewn to the item.

In some scenarios, the machine installation process involves: turning the reel by an amount that allows a portion of the substrate to be deposited with a conductive layer over all or at least part of the substrate; controlling a laser to remove (e.g., burning) a portion of the conductive layer (i.e., tuning); cutting the substrate (e.g., by a laser) at an end thereof so that a tag is placed or otherwise disposed on the item; and using a heat source (e.g., a laser) to melt/weld/adhere with or without an adhesive at least one side of the tag onto the item. In some implementations, the tag may be unable to be felt when affixed to the item.

In some scenarios, the machine installation process involves: turning the reel by an amount that allows a portion of the substrate to be deposited with a conductive layer over all or at least part of the substrate; controlling a laser to remove (e.g., burning) a portion of the conductive layer (i.e., tuning); cutting the substrate (e.g., by a laser) at an end thereof so that a tag is placed or otherwise disposed on the item; using a heat source (e.g., a laser) to melt/weld/adhere with or without an adhesive at least one side of the tag onto the item; and using the same or different heat source to transform the visual appearance of the tag. In some cases, the tag may be unable to be felt and or seen when affixed to the item.

In some scenarios, the machine installation process involves: a tray including a plurality of substrates; while being held stable, depositing a conductive layer over all or at least part of the substrate; controlling a laser to remove (e.g., burning) a portion of the conductive layer (i.e., tuning); using a heat source (e.g., a laser) to melt/weld/adhere with or without an adhesive at least one side of the tag onto the item; and using the same or different heat source to transform the visual appearance of the tag. In some cases, the tag may be unable to be felt and or seen when affixed to the item.

Another solution comprises forming tag antennas by sewing metal thread(s) directly into an item at production time and/or by printing or disposing metal trace(s) directly on the garment at production time. The length(s) of the metal thread(s)/trace(s) are dynamically selected or altered by a laser for optimizing tag performance in view of the item's dielectric and tuning properties. The item's dielectric and tuning properties include, but are not limited to, an impedance and/or capacitance. Next, the metal thread(s) or trace(s) is(are) sewn into, printed on, or disposed directly on the item. At least a communications enabled device is then attached to the item so as to form an electrical coupling or connection between the communication enabled device and the antenna(s). This technique for coupling a tag to an item provides a relatively inexpensive solution that is performed during the production of the item. Additionally, the metal thread(s) and/or trace(s) is(are) difficult to feel when incorporated into the item.

Another solution comprises forming tag antennas by tuning the tags during production specifically for a type of the items for which they will be placed in or on, and/or where on a body of the person the tag may be located when the item is worn by the person. As described above, the length(s), width(s) and height(s) of the conductive layer/trace(s) are dynamically selected or altered by a laser for optimizing tag performance in view of the item's dielectric and tuning properties. The item's dielectric and tuning properties include, but are not limited to, an impedance and/or capacitance of the material of the item and/or the placement of the tag on the item, and/or a diameter and/or size of a loop antenna.

In some scenarios, the communications enabled device is coated with a flexible fluid resistive material or other substance so that the same is machine washable and/or water resistant. Additionally or alternatively, the ends of the metal thread(s) are coated with a substance selected to reduce or eliminate irritation caused by the metal thread(s) to an individual using the item.

In some scenarios the tags may not be directly attached to an item, but may be first placed within a hard covering creating a hard tag. The hard tag may then be attached to an item. In one aspect of the disclosure, the tag may be attached to the hard covering using a heat source (e.g., a laser) to melt/weld/adhere with or without an adhesive at least one side of the tag onto the hard tag. In one aspect of the disclosure, the item affixed with the tag may include, but is not limited to, a garment, a box, and a physical item.

Notably, the present solution provides significantly thinner tags as compared to conventional solutions. Some conventional tags include tags that are formed on a flexible narrow substrate. The tags have a 0.005 inch thickness. The flexible narrow substrate is strong enough such that it cannot be torn by an individual, but can be cut using a razor or scissor. Accordingly, a plurality of tags are formed on a single piece of narrow substrate. The narrow substrate is cut to separate the tags from each other. The separated tag(s) is(are) then coupled to item(s). When cut, the tags fold up onto themselves which is undesirable since antenna lengths are shortened whereby tag performance is affected.

Other conventional tags include an array of RFID tags glued to a PET roll. The PET roll is 0.002 inches thick. The RFID tag is about 0.008 inches thick. Leading to a total tag thickness of 0.015 inches. This tag is too thick for garment applications since the tag causes discomfort and irritation to the wearer of the garment.

The automated production assembly of the present solution allows for tags with significantly reduced dimensions. The present solution employs a substrate with a thickness between 0.0001 and 0.0005 inches. Although thin, this substrate maintains enough physical strength to handle the tension required to maintain the substrate on the roll. Tags on the order of 0.001 inches and smaller are placed on this substrate (which may have a width of 0.001 inches). The total thickness of the substrate/tag assembly is much smaller than that of the conventional solutions.

A present solution provides a roll technology that addresses the drawbacks of the conventional tags which roll up onto themselves. The tags of the present solution maintain their straightness or planar profiles so as to keep the antennas at the proper lengths. The tags of the present solution are so thin that they are not seen or felt when integrated into seams or other points in fabric items. The substrate of the present solution can include, but is not limited to, paper, PEP, PVC, or polymer.

Further, the present solution provides for tags that are specifically tuned and matched for each type of item for which they are affixed based on a material of the item and/or tag and/or a location of the item when worn by a person and how such material and/or location affects the dielectric and tuning properties of the tag, and which addresses the drawbacks of the conventional tags which need to be turned after being manufactured and/or affixed to products.

Additionally, the present solution provides for tags that are attached to items using a heat source (e.g., using a laser, infrared ("IR"), and/or a light source (e.g., ultraviolet ("UV") light) to affix (e.g., heat welding, curing of an adhesive/glue applied to the tag and/or the item, etc.) the tags. As such, the current solution may avoid problems experienced by other typical attaching techniques, such as sewing, wherein the needle may hit the tag and destroy the operation of the tag.

Illustrative System

Referring now to FIG. 1, there is provided an illustration of an illustrative system 100 that is useful for understanding the present solution. The present solution is described herein in relation to a retail store environment. The present solution is not limited in this regard, and can be used in other environments. For example, the present solution can be used in distribution centers, factories and other commercial environments. Notably, the present solution can be employed in any environment in which items need to be located and/or tracked.

The system 100 is generally configured to allow inventory counts of items located within a facility. The items, for example, may be garments, box, and/or other product or item. As shown in FIG. 1, system 100 comprises a Retail Store Facility ("RSF") 128 in which display equipment $102_1, \ldots, 102_M$ (collectively referred to as "102") is disposed. The display equipment is provided for displaying items $110_1$-$110_N$ (collectively referred to as "110"), $116_1$-$116_X$ (collectively referred to as "116") to customers of the retail store. The display equipment can include, but is not limited to, shelves, article display cabinets, promotional displays, fixtures and/or equipment securing areas of the RSF 128. The RSF can also include emergency equipment (not shown), checkout counters, an EAS system (not shown), an RFID system, and/or an RFID/EAS system. Emergency equipment, checkout counters, video cameras, people counters, EAS systems, RFID systems, and/or RFID/EAS systems are well known in the art, and therefore will not be described herein.

At least one tag reader 120 is provided to assist in counting the items $110_1$-$110_N$, $116_1$-$116_X$ located within the RSF 128. The tag reader 120 comprises an RFID reader configured to read RFID tags. RFID readers are well known in the art. Any known or to be known RFID reader can be used herein without limitation. An illustrative tag reader will be discussed below in relation to FIG. 3.

Tags $112_1$-$112_N$ (collectively referred to as "112"), $118_1$-$118_X$ (collectively referred to as "118") are respectively attached or coupled to the items $110_1$-$110_N$, $116_1$-$116_X$. The tags are described herein as comprising single-technology tags that are only RFID enabled. The present solution is not limited in this regard. The tags can alternatively or additionally comprise dual-technology tags that have both EAS and RFID capabilities.

Notably, the tag reader 120 is strategically placed at a known location within the RSF 128. By correlating the tag reader's tag reads and the tag reader's known location within the RSF 128, it is possible to determine the location of items $110_1, \ldots, 110_N$, $116_1, \ldots, 116_X$ within the RSF 128. The tag reader's known coverage area also facilitates item location determinations. Accordingly, tag read information and tag reader location information is stored in a data store 126. This information can be stored in the data store 126 using a server 124. Servers are well known in the art, and therefore will not be described herein.

Figure 2:
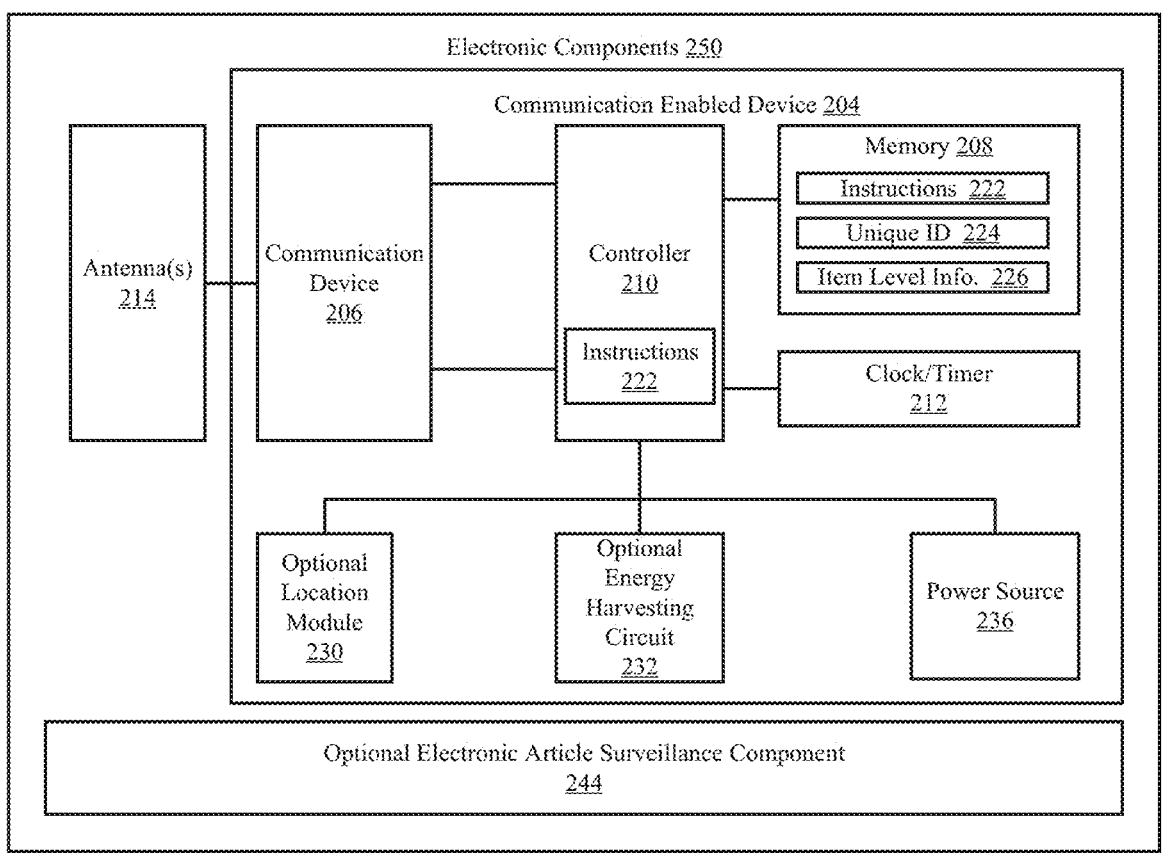
FIG. 2 is an illustration of an illustrative architecture for a tag.

Referring now to FIG. 2, there is an illustration of an illustrative architecture for a tag 200. Tags 112, 118 of FIG. 1 are the same as or similar to tag 200. As such, the discussion of tag 200 is sufficient for understanding the tags 112, 118 of FIG. 1.

The tag 200 can include more or less components than that shown in FIG. 2. However, the components shown are sufficient to disclose an illustrative embodiment implementing the present solution. Some or all of the components of the tag 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 represents a representative tag 200 configured to facilitate inventory management. In this regard, the tag 200 is configured for allowing data to be exchanged with an external device (e.g., tag reader 120 of FIG. 1 and/or server 124 of FIG. 1) via wireless communication technology. The wireless communication technology can include, but is not limited to, a Radio Frequency Identification ("RFID") technology, a Near Field Communication ("NFC") technology, and/or a Short Range Communication ("SRC") technology. For example, one or more of the following wireless communication technologies (is)are employed: Radio Frequency ("RF") communication technology; Bluetooth technology; WiFi technology; and/or beacon technology. Each of the listed wireless communication technologies is well known in the art, and therefore will not be described in detail herein. Any known or to be known wireless communication technology or other wireless communication technology can be used herein without limitation.

The components 204, 244 shown in FIG. 2 may be collectively referred to herein as electronic components 250. The components 206-212 shown in FIG. 2 may be collectively referred to herein as a communication enabled device 204, and include a memory 208 and a clock/timer 212. Memory 208 may be a volatile memory and/or a non-volatile memory. For example, the memory 208 can include, but is not limited to, Random Access Memory ("RAM"), Dynamic RAM ("DRAM"), Static RAM ("SRAM"), Read Only Memory ("ROM") and flash memory. The memory 208 may also comprise unsecure memory and/or secure memory.

As shown in FIG. 2, the communication enabled device 204 is electrically coupled or connected to one or more antenna(s) 214 for allowing data to be exchanged with the external device via a wireless communication technology (e.g., an RFID technology, an NFC technology and/or a SRC technology). The antenna(s) 214 is(are) configured to receive signals from the external device and/or transmit signals generated by the communication enabled device 204. The antenna(s) 214 can comprise a near-field or far-field antenna. The antenna(s) include, but are not limited to, a chip antenna or a loop antenna.

The communication enabled device 204 also comprises a communication device (e.g., a transceiver or transmitter) 206. Communication devices (e.g., transceivers or transmitters) are well known in the art, and therefore will not be described herein. However, it should be understood that the communication device 206 generates and transmits signals (e.g., RF carrier signals) to external devices, as well as receives signals (e.g., RF signals) transmitted from external devices. In this way, the communication enabled device 204 facilitates the registration, identification, location and/or tracking of an item (e.g., item 110 or 112 of FIG. 1) to which the tag 200 is coupled.

Item level information 226 and a unique identifier ("ID") 224 for the tag 200 can be stored in memory 208 of the communication enabled device 204 and/or communicated to other external devices (e.g., tag reader 120 of FIG. 1 and/or server 124 of FIG. 1) via communication device (e.g., transceiver) 206. For example, the communication enabled device 204 can communicate information specifying a timestamp, a unique identifier for an item, item description, item price, a currency symbol, size information, sale information, and/or location information to an external device. The external device (e.g., server) can then store the information in a database (e.g., database 126 of FIG. 1) and/or use the information for various purposes.

The communication enabled device 204 also comprises a controller 210 (e.g., a CPU). The controller 210 can execute instructions 222 implementing methods for facilitating inventory counts and management. In this regard, the controller 210 includes a processor (or logic circuitry that responds to instructions) and the memory 208 includes a computer-readable storage medium on which is stored one or more sets of instructions 222 (e.g., software code) configured to implement one or more of the methodologies, procedures, or functions described herein. The instructions 222 can also reside, completely or at least partially, within the controller 210 during execution thereof by the tag 200. The memory 208 and the controller 210 also can constitute machine-readable media. The term "machine-readable media", as used here, refers to a single medium or multiple media (e.g., a centralized or distributed database, and/or associated caches and servers) that store the one or more sets of instructions 222. The term "machine-readable media", as used here, also refers to any medium that is capable of storing, encoding or carrying a set of instructions 222 for execution by the tag 200 and that cause the tag 200 to perform any one or more of the methodologies of the present disclosure.

The clock/timer 212 is configured to determine a date, a time, and/or an expiration of a pre-defined period of time. Technique for determining these listed items are well known in the art, and therefore will not be described herein. Any known or to be known technique for determining these listed items can be used herein without limitation.

The tag 200 also comprises an optional location module 230. The location module 230 is generally configured to determine the geographic location of the tag at any given time. For example, in some scenarios, the location module 230 employs Global Positioning System ("GPS") technology and/or Internet based local time acquisition technology. The present solution is not limited to the particulars of this example. Any known or to be known technique for determining a geographic location can be used herein without limitation including relative positioning within a facility or structure.

The tag 200 can also include an optional EAS component 244. EAS components 244 are well known in the art, and therefore will not be described herein. Any known or to be known EAS component can be used herein without limitation.

As shown in FIG. 2, the tag 200 may also comprise a power source 236 and/or optional energy harvesting circuit 232. The power source 236 can include, but is not limited to, a rechargeable battery and/or a capacitor. The energy harvesting circuit 232 is configured to harvest energy from one or more sources (e.g., heat, vibration, magnetic field, and/or RF energy) and to generate a relatively low amount of output power from the harvested energy. By employing multiple sources for harvesting, the device can continue to charge despite the depletion of a source of energy. Energy harvesting circuits are well known in the art, and therefore will not be described herein. Any known or to be known energy harvesting circuit can be used herein without limitation.

The present solution is not limited to that shown in FIG. 2. The tag 200 can have any architecture provided that it can perform the functions and operations described herein. For example, all of the components shown in FIG. 2 can comprise a single device (e.g., an Integrated Circuit ("IC")).

Figure 3:
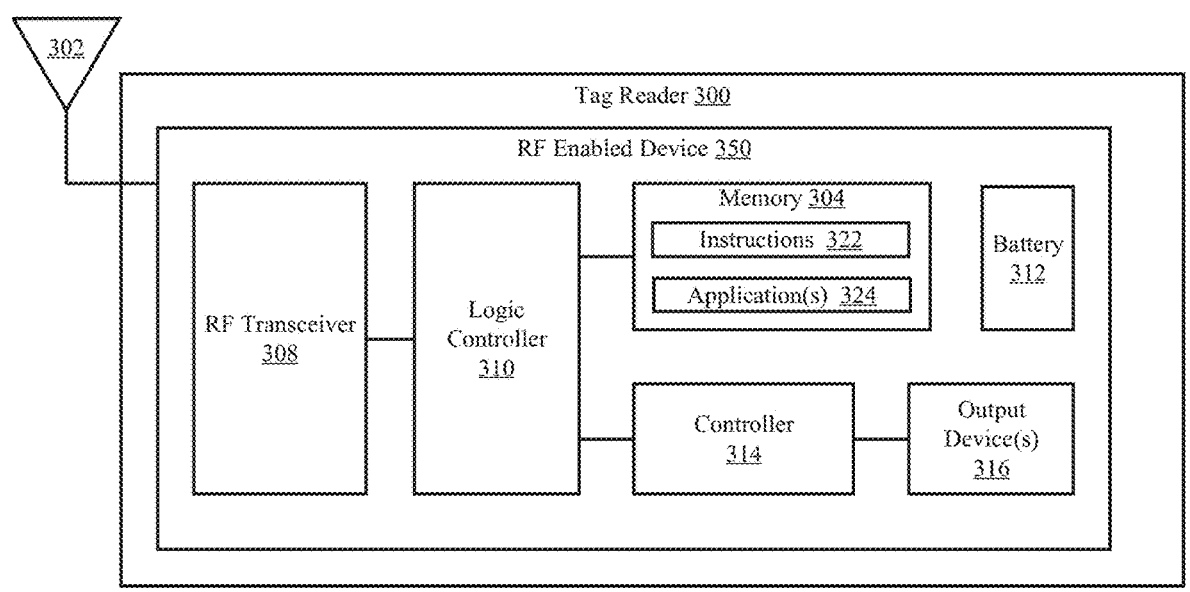
FIG. 3 is an illustration of an illustrative architecture for a tag reader.

Referring now to FIG. 3, there is provided a detailed block diagram of an illustrative architecture for a tag reader 300. Tag reader 120 of FIG. 1 is the same as or similar to tag reader 200. As such, the discussion of tag reader 200 is sufficient for understanding tag reader 120.

Tag reader 300 may include more or less components than that shown in FIG. 3. However, the components shown are sufficient to disclose an illustrative embodiment implementing the present solution. Some or all of the components of the tag reader 300 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 3 represents an illustration of a representative tag reader 300 configured to facilitate inventory counts and management within an RSF (e.g., RSF 128 of FIG. 1). In this regard, the tag reader 200 comprises an RF enabled device 350 for allowing data to be exchanged with an external device (e.g., tags 112, 118 of FIG. 1) via RF technology. The components 304-316 shown in FIG. 3 may be collectively referred to herein as the RF enabled device 350, and may include a power source 312 (e.g., a battery) or be connected to an external power source (e.g., an AC mains).

The RF enabled device 350 comprises an antenna 302 for allowing data to be exchanged with the external device via RF technology (e.g., RFID technology or other RF based technology). The external device may comprise tags 112, 118 of FIG. 1. In this case, the antenna 302 is configured to transmit RF carrier signals (e.g., interrogation signals) to the listed external devices, and/or transmit data response signals (e.g., authentication reply signals) generated by the RF enabled device 350. In this regard, the RF enabled device 350 comprises an RF transceiver 308. RF transceivers are well known in the art, and therefore will not be described herein. However, it should be understood that the RF transceiver 308 receives RF signals including information from the transmitting device, and forwards the same to a logic controller 310 for extracting the information therefrom.

The extracted information can be used to determine the presence, location and/or type of movement of a tag within a facility (e.g., RSF 128 of FIG. 1). Accordingly, the logic controller 310 can store the extracted information in memory 304, and execute algorithms using the extracted information. For example, the logic controller 310 can correlate tag reads with beacon reads to determine the location of the tags within the facility. Other operations performed by the logic controller 310 will be apparent from the following discussion.

Notably, memory 304 may be a volatile memory and/or a non-volatile memory. For example, the memory 304 can include, but is not limited to, a RAM, a DRAM, an SRAM, a ROM, and a flash memory. The memory 304 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Instructions 322 are stored in memory for execution by the RF enabled device 350 and that cause the RF enabled device 350 to perform any one or more of the methodologies of the present disclosure. The instructions 322 are generally operative to facilitate determinations as to whether or not tags are present within a facility, where the tags are located within a facility, and/or which tags are in motion at any given time. Other functions of the RF enabled device 350 will become apparent as the discussion progresses.

Illustrative Tag Architectures

Referring now to FIG. 4, there is provided an illustration of an illustrative architecture for a tag 400. Tag 400 may be the same as or similar to tag $112_1, \ldots, 112_N, 118_1, \ldots, 118_X$ of FIG. 1 or tag 200 of FIG. 2. As such, the discussion provided above in relation to tags 112, 118, 200 is sufficient for understanding the operations of tag 400. Notably, the tag 400 is designed to be relatively thin so that it is hard to feel when incorporated into an item (e.g., item $110_1, \ldots, 110_N$, $116_1, \ldots$, or $116_X$ of FIG. 1) to, but thick enough to withstand a certain number (e.g., 2-5) of wash cycles. The item can include, but is not limited to, a cloth item, a paper item, and/or a plastic item.

Figures 4A, 4B:
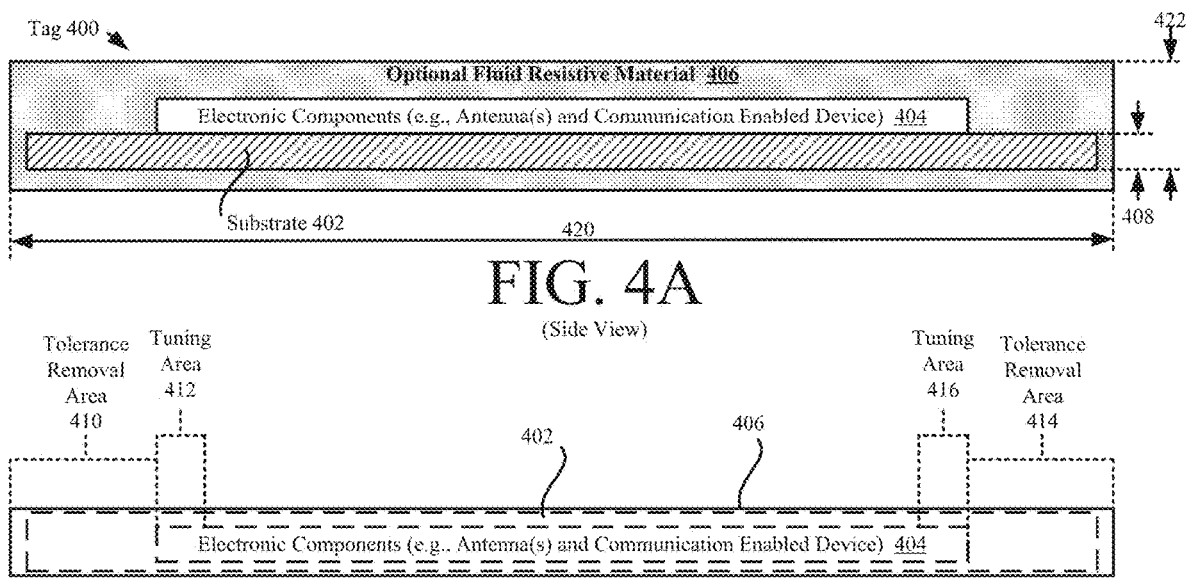
FIGS. 4A-4B (collectively referred to herein as "FIG. 4") provide illustrations showing an illustrative architecture for a tag.

As shown in FIG. 4A, tag 400 comprises a substrate 402 on which electronic components 404 are mounted, attached or disposed. The electronic components 404 can be the same as or similar to electronic components 250 of FIG. 2. Accordingly, the electronic components 404 can include antenna(s), a communication enabled device, and/or an EAS component.

The substrate 402 is a relatively thin, narrow, light weight, recyclable and/or machine washable substrate. The substrate 402 can include, but is not limited to, any type of flexible material as described above, such as but not limited to a fabric, a silk, a cloth, a plastic, and/or a paper. The substrate 402 may comprise a polyester (e.g., PET) substrate. A thickness 408 of the substrate 402 is selected so that the substrate 402 has a physical strength that allows a machine to maintain tension on the same while incorporating or installing the tag on the item, and so that a metalized layer thereon creates antenna(s) for the tag. For example, thickness 408 can have a value between 0.0001 inches and 0.0025 inches. A width of the substrate 402 can be between 0.001 inches and 0.002 inches, which is small enough so that the tag is not felt by humans when incorporated into an item. The present solution is not limited to the particulars of this example. In another aspect of the disclosure, for example, the tag may be affixed to an item in a variety of locations by heat welding or curing of an adhesive that was applied to the tag.

In some scenarios, the substrate 402 and electronic components 404 are coated with a layer of a flexible fluid resistive material 406 for protecting the same from damage due to fluid exposure. The fluid resistive material 406 can include, but is not limited to, a TPU material and/or a PET material. The fluid resistive material 406 can be applied to either or both sides of the substrate. The fluid resistive material 406 may be colored to match the color of the item (e.g., item $110_1, \ldots, 110_N, 116_1, \ldots$, or $116_X$ of FIG. 1) to which the tag 400 is to be coupled. As described above, the fluid resistive material 406 can also be altered in appearance via a heat source. The appearance may be altered by changing from one color and/or pattern to another one of a variety of colors and/or patterns. For example, but not limited hereto, the fluid resistive material 406 can altered from a clear color to a purple and yellow polka dots.

Figure 5:
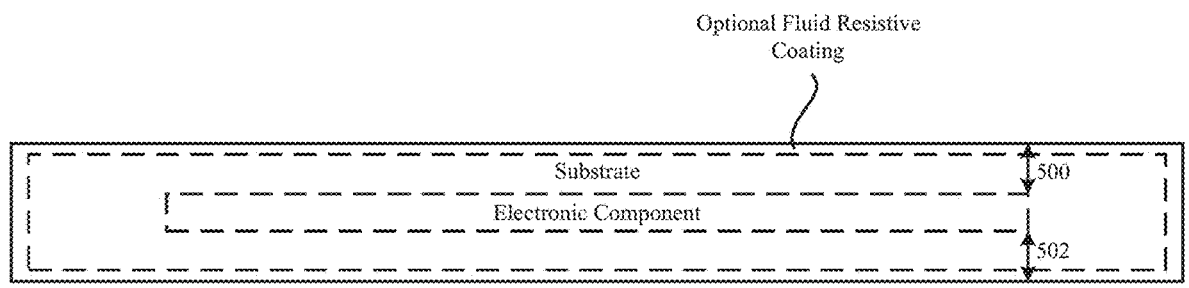
FIG. 5 provides an illustration of another illustrative architecture for a tag.

As shown in FIG. 4B, the tag 400 has tolerance removal areas 410, 414. Each tolerance removal area 410, 414 comprises an end portion of the substrate 402. These end portions of the substrate 402 facilitate the cutting and coupling of the tag 400 to the item (e.g., via stitching and/or affixing by heat) without interference with and/or causing damage to the antenna(s). In some scenarios, additional substrate is provided on the elongate sides of the tag, as shown by arrows 500, 502 of FIG. 5.

In some scenarios, the antenna(s) of the electronic components 404 are formed as conductive trace(s) via ink printing and/or deposition (e.g., sputter deposition). Ink printing and deposition processes are well known in the art, and therefore will not be described herein. The conductive trace/ink/layer, as used throughout may be, but are not limited to, silver, copper, gold, aluminum, nickel, or various forms of carbon, either suspended as particles or dissolved in a solution.

The antenna(s) can be linear, serpentine or otherwise meandering. In some scenarios, a length 420 of the tag 400 can be in the range of 140-170 mm when the antenna(s) is(are) linear or comprise straight line(s). In contrast, length 420 can be in the range of 60-150 mm when the antenna(s) is(are) serpentine or otherwise meandering. A thickness of the antenna(s) should be as thin as possible provided that the tag 400 has enough physical strength to withstand a given pulling force and/or a given number of wash cycles.

The antenna(s) may be designed so that the tag's operating frequency is in a range of 840-960 Mhz (inclusive of 840 and 960), a range of 860-940 Mhz (inclusive of 860 and 940), a range of 865-868 Mhz (inclusive of 865 and 868), or a range of 902-928 Mhz (inclusive of 902 and 928). The antenna(s) may additionally or alternatively comprise tuning area(s) 412, 416. Each tuning area 412, 416 comprises a portion of an antenna that can be modified for selectively and/or dynamically tuning an operating frequency of the tag (e.g., at the time of the tag's installation on the item in view of the item's dielectric and tuning properties). In another aspect of the disclosure, each tuning area 412, 416 comprises a portion of an antenna that can be modified for selectively and/or dynamically tuning an operating frequency of the tag (e.g., at the time of manufacture based on the location and/or the item for which the tag will be affixed). The tuning area can be modified by removing the conductive material in a variety of directions. For example, the tuning area can be modified by decreasing a thickness of the conductive material in that area. Further, for example, the tuning area can be modified by decreasing a width of the conductive material in that area. Further, for example, the tuning area can be modified by decreasing a height of the conductive material in that area. Further, for example, the tuning area can be modified by completely removing the conductive material in that area. In one example, for instance, the tuning area can be modified by the laser to remove material to increase a diameter of a conductive loop formed by the conductive material. In one aspect of the disclosure the tuning characteristics may be determined in advance of manufacturing the tags by determining the item for which the tags will be attached. In one aspect of the disclosure the tuning characteristics may be determined in real time of manufacturing the tags by adjusting the system remove a specific amount/location of conductive material based upon a final tuning.

A laser, razor or other device can be used to precisely decrease the conductive material in the tuning area. In one aspect of the disclosure a camera, optical sensors, or alignment devices may be used to position the laser relative to the tuning area and/or the item to enable the laser to precisely remove conductive material at a specific location and/or to enable the laser to remove a precise amount of conductive material.

This tuning technique may not be needed if all items have similar dielectric properties. However, the items may be of the same type, but of different sizes. In this case, the tuning technique provides a way to optimize each stock-keeping unit in advance for the item to which the tag is to be installed on. The method to tune each antenna at installation time may be used if the volume was not high enough to produce separate stock-keeping units for each production run.

In other scenarios, the antenna(s) are formed by coupling physical wire(s) to the substrate 402. Each wire may have a diameter between 0.1 mm and 1 mm, and a length between 100 mm and 160 mm. The thickness and/or length of the wire(s) can be decreased at installation time to facilitate the dynamic tuning of the tag's operating frequency in view of the item's dielectric and tuning properties.

Figure 6:
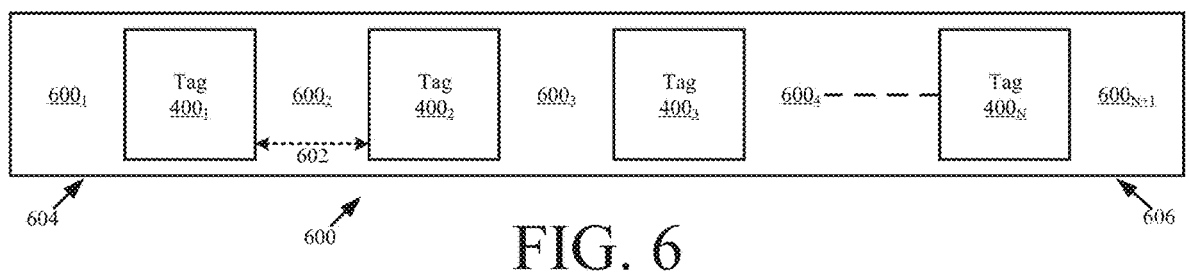
FIGS. 6-8 provide illustrations that are useful for understanding the present solution in which a plurality of tags are formed on a narrow substrate.

Referring now to FIG. 6, there is provided an illustration of an elongate narrow substrate 600 having a plurality of tags $400_1, 400_2, \ldots, 400_N$ coupled thereto. The elongate narrow substrate can include, but is not limited to, ribbon. Each tag $400_1, 400_2, \ldots, 400_N$ is the same as or similar to tag 400 of FIG. 4. Thus, the discussion of tag 400 is sufficient for understanding tags $400_1, 400_2, \ldots, 400_N$.

The tags $400_1, 400_2, \ldots, 400_N$ are arranged on the substrate 600 so as to have equal spacing 602 between adjacent ones thereof. The adjacent tags are spaced apart from each other so that a portion of the substrate $600_2, 600_3, 600_4$ resides therebetween, respectively. The first tag $400_1$ is also spaced from an end 604 of the substrate 600 by an amount defined by substrate portion $600_1$. Similarly, the last tag $600_N$ is spaced from an end 606 of the substrate 600 by an amount defined by substrate portion $600_{N+1}$. The substrate portions $600_1, \ldots, 600_{N+1}$ may constitute tolerance removal areas of tags (e.g., tolerance removal areas 410, 414 of FIG. 4B) as shown in FIG. 7, or alternatively may be provided in addition to the tag tolerance removal areas.

Figure 7:
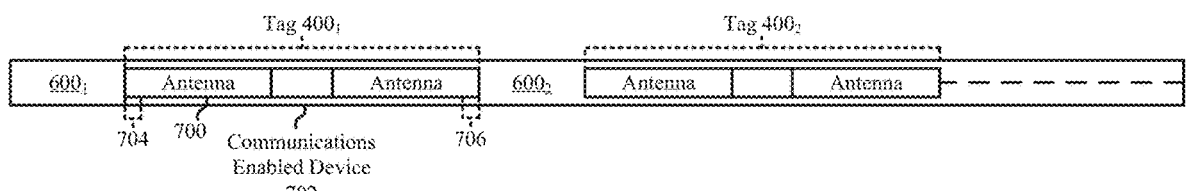

As shown in FIG. 7, each tag comprises two antennas 700 and a communication enabled device 702. Each antenna 700 has a tuning area 704 or 706. The antennas are the same as or similar to antenna(s) 214 of FIG. 2. The tuning areas 704, 706 are the same as or similar to tuning areas 412, 416 of FIG. 4. Each communication enabled device 702 is the same as or similar to communication enabled device 204 of FIG. 2. Thus, the discussions provided above in relation to 204, 214, 412, 416 are sufficient for understanding components 700-706 of FIG. 7.

Figure 8:

The present solution is not limited to the particulars of the architecture shown in FIGS. 6-7. In other scenarios, the tags are unequally spaced apart as shown in FIG. 8.

Figure 9:
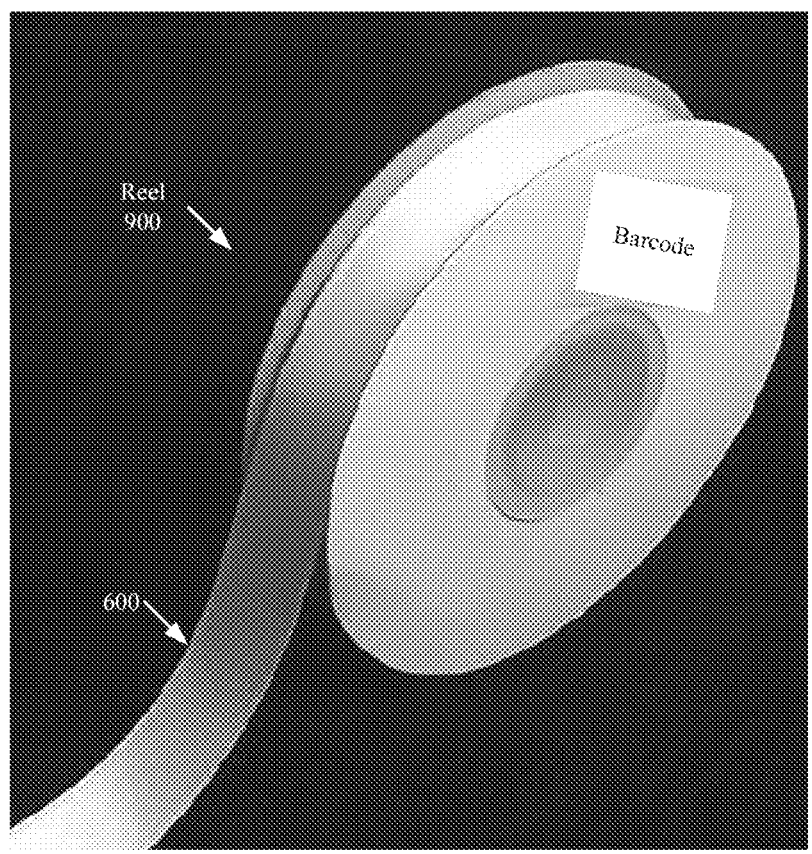
FIG. 9 provides an illustration showing a narrow substrate (with tags coupled thereto) that is rolled onto a reel.

Referring now to FIG. 9, there is provided an illustration showing a reel 900 onto which the substrate 600 is rolled. The reel 900 may be used to incorporate tags with items (e.g., during a relatively high volume manufacturing process). For example, during an item manufacturing process, the reel 900 is turned so that a tag is rolled onto an item. The substrate 600 is then cut within the tag's tolerance removal area so that the tag remains on the item for attachment thereto. This process is repeated for each item that is to have a tag incorporated therein.

Figure 10:
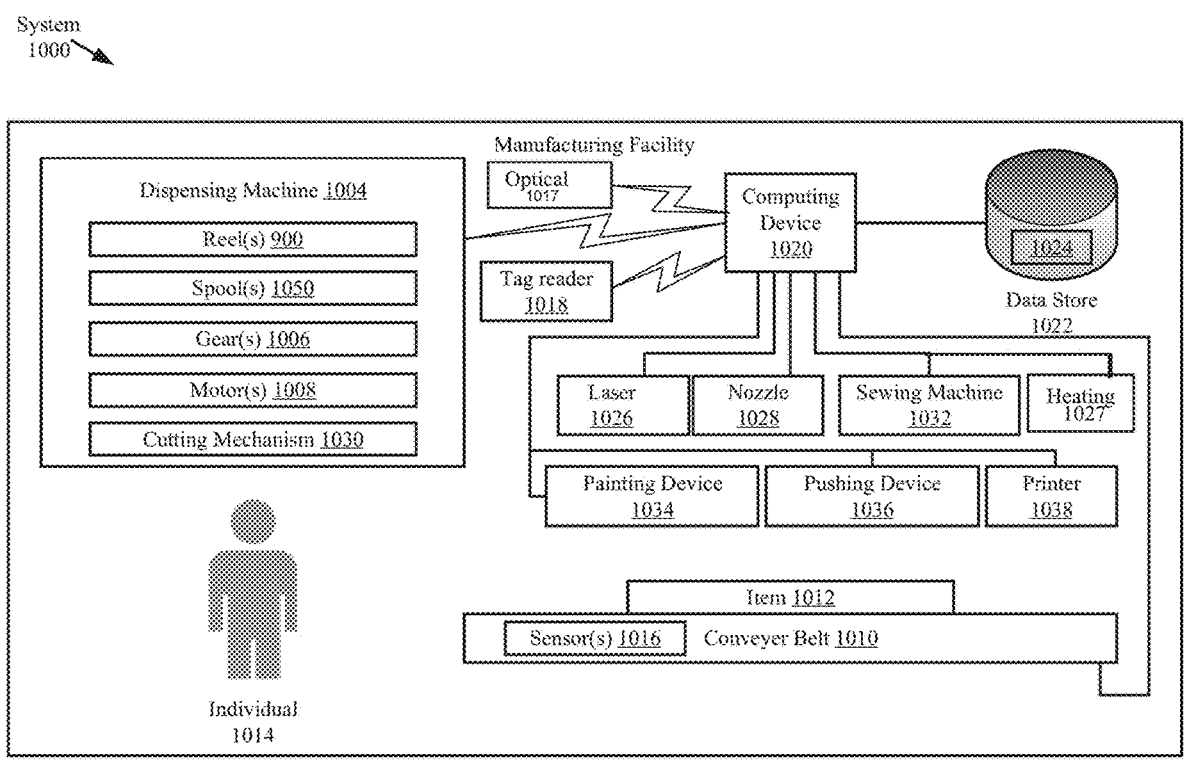
FIG. 10 provides an illustration showing an illustration system for incorporating tag(s) into item(s)

An illustration of an illustrative system 1000 for integrating or incorporating tags into or with items is provided in FIG. 10. As shown in FIG. 10, system 1000 comprises a dispensing machine 1004, a conveyer belt 1010, a tag reader 1018, a computing device 1020, a data store 1022, and a laser 1026. The tag reader 1018 can be the same as or similar to tag reader 300 of FIG. 3.

The dispensing machine 1004 is configured to receive the reel 900 and/or a spool 1050, and rotate the reel/spool in two opposing directions. The rotation is achieved using gear(s) 1006 and motor(s) 1008. The spool 1050 can include, but is not limited to, a spool of metal thread. Metal thread is well known in the art, and therefore will not be described herein.

As noted above, an elongate narrow substrate 600 is wound on the reel 900. The elongate narrow substrate comprises a plurality of tags $400_1, \ldots, 400_N$ coupled thereto. The elongate narrow substrate with the plurality of tags may be coated using a flexible fluid resistive material (e.g., flexible resistive material 406 of FIG. 4). The flexible fluid resistive material can have a color that matches a color of the item(s). As described above, the flexible fluid resistive material may also have characteristics (e.g., pattern, color, adhesion) that are alterable by a heat source (e.g., a laser, UV, and/or IR radiation). Each of the tags comprises at least one antenna 700 formed of a trace or wire disposed on the elongate narrow substrate, and a communication enabled device 702 coupled to the elongate narrow substrate so as to have an electrical coupling or connection with the at least one antenna.

During a manufacturing process, a conveyer belt 1010 or an individual 1014 moves an item 1012 into proximity of the dispensing machine 1004. The computing device 1020 then controls the dispensing machine 1004 to turn the reel 900 by an amount that allows a portion of the ribbon 600 to be paid out. This portion of the ribbon 600 includes a tag comprising a communications enabled device and antenna(s).

The laser 1026 may then be controlled by the computing device 1020 to tune the antenna(s) of the tag (e.g., by removing ends of antenna wires and/or by decreasing the trace thickness in tuning areas of the antenna(s)). The computing device 1020 may comprise a camera, optical sensors, alignment devices, etc., to ensure the antenna is properly aligned and/or configured. The tuning is performed for optimizing tag performance in view of the item's dielectric and tuning properties. The item's dielectric and tuning properties can be obtained using a Look Up Table ("LUT") 1024 and/or determined using sensor data generated by sensors 1016. Other devices can be used to tune the tag. Such other devices include, but are not limited to, a razor and/or a sewing machine.

The ribbon 600 is then cut by the cutting mechanism 1030 of the dispensing machine 1004 so that the paid out portion of the ribbon is placed on or otherwise disposed on the item. The cutting mechanism 1030 can include, but is not limited to, a razor and/or scissors. Razors and scissors are well known in the art, and therefore will not be described herein. In another aspect of the disclosure, the ribbon 600 is then cut by the laser 1026.

The portion of the ribbon is then coupled to the item so that the tag is incorporated with or in the item. For example, a nozzle 1028 dispenses an adhesive on the item 1012 and/or portion of ribbon, and/or the tag, and a separate heating element 1027 (e.g., UF, IR) applies heat to the adhesive located on the portion of ribbon and/or item 1012 and/or tag, the laser 1026 and/or the heating element 1027 heat welds or cures the adhesive. Nozzles, heating elements, sewing machines, pushing devices, and metal threads are well known in the art, and therefore will not be described herein. The present solution is not limited to the particulars of this example. The optical device 1017 (e.g., camera, sensor, laser, and alignment device) may be used to precisely control the tuning and/or affixing to an item and/or altering the appearance of the tag.

In some scenarios, the portion of the elongate narrow substrate can be painted by a painting device 1034 using paint with a color that matches a color of the item 1012. The paint can be applied prior to or subsequent to the cutting of ribbon 600.

In some scenarios, exterior appearance of the tag can be altered by the laser 1026 and/or the heating element 1027, such as by applying a sufficient amount of heat to change a heat-variable characteristic of a component of the tag.

At this time, proper operation of the tag may then optionally be validated. The validation can be achieved using the tag reader 1018. If the tag is operating properly, then other manufacturing operations are performed. In contrast, if the tag is not operating properly, then the tag is removed from the item, and a new tag is coupled to the item.

In some scenarios, system 1000 is additionally or alternatively configured to incorporate tags into items using a metal thread of spool 1050 to form the tag antenna(s). For example, the computing device 1020 performs operations to: determine the dielectric and tuning properties of the item using the LUT 1024 or sensor data generated by sensor(s) 1016; and/or dynamically determine a length of each metal thread that is to be incorporated into the item 1012 to optimize tag performance in view of dielectric and tuning properties of the item 1012. The cutting mechanism 1030 creates at least one metal thread having the length that was dynamically determined. One or both ends of the metal thread may be coated with a substance selected to reduce or eliminate irritation caused by the metal thread to an individual using the item 1012.

The sewing machine 1032 then sews the metal thread into the item 1012 being produced to form at least one antenna (e.g., antenna(s) 214 of FIG. 2) for the tag (e.g., tag $112_1, \ldots, 112_N, 118_1, \ldots, 118_X$, 200 of FIG. 2). The nozzle 1028 may then attach at least a communications enabled device (e.g., communications enabled device 204 of FIG. 2) to the item 1012 so as to form an electrical coupling or connection between the communications enabled device and the at least one antenna. The item 1012 may have at least one alignment marking that can be used in the attaching to guide proper placement of the at least one communication enabled device on the item 1012. The alignment markings can include, but are not limited to, shape(s) or line(s) printed on the item (e.g., in a color different than the item's color), created by stitching (e.g., using thread in a color different than the item's color), and/or formed using die(s) (e.g., a die with a color different than the item's color). The communications enabled device may be encased with a flexible fluid resistive material, and/or attached to a piece of substrate prior to being attached to the item 1012.

At this point in the process, the tag reader 1018 may validate that the tag is operating properly. The communications enabled device may be replaced with another communications enabled device when a validation is not made that the first tag is operating properly. Additionally or alternatively, the metal thread is replaced with another metal thread when a validation is not made that the first tag is operating properly.

In those or other scenarios, system 1000 is additionally or alternatively configured to incorporate tags into items using conductive trace(s) to form the tag antenna(s). For example, the computing device 1020 performs operations to: determine the dielectric and tuning properties of the item using the LUT 1024 or sensor data generated by sensor(s) 1016; and/or dynamically determine a length of each conductive trace to be formed directly on the item 1012 to optimize tag performance in view of dielectric and tuning properties of the item 1012. Each conductive trace is disposed on the item being produced to form at least one antenna for a tag. The conductive traces can be printed on the item via a printer 1038 or deposited on the item by the nozzle 1028. Printers and nozzles are well known in the art, and therefore will not be described here.

The nozzle 1028 may then attach at least a communications enabled device (e.g., communications enabled device 204 of FIG. 2) to the item 1012 so as to form an electrical coupling or connection between the communications enabled device and the at least one antenna (e.g., inductive coupling). The item 1012 may have at least one alignment marking that can be used in the attaching to guide proper placement of the at least one communication enabled device on the item 1012. The alignment markings can include, but are not limited to, shape(s) or line(s) printed on the item (e.g., in a color different than the item's color), shape(s) or line(s) created by stitching (e.g., using thread in a color different than the item's color), and/or shape(s) or line(s) formed using die(s) (e.g., a die with a color different than the item's color). The communications enabled device may be encased with a flexible fluid resistive material, and/or attached to a piece of substrate prior to being attached to the item 1012.

At this point in the process, the tag reader 1018 may validate that the tag is operating properly. The communications enabled device may be replaced with another communications enabled device when a validation is not made that the first tag is operating properly. Additionally or alternatively, the conductive trace(s) is(are) tuned when a validation is not made that the first tag is operating properly.

Figure 11:
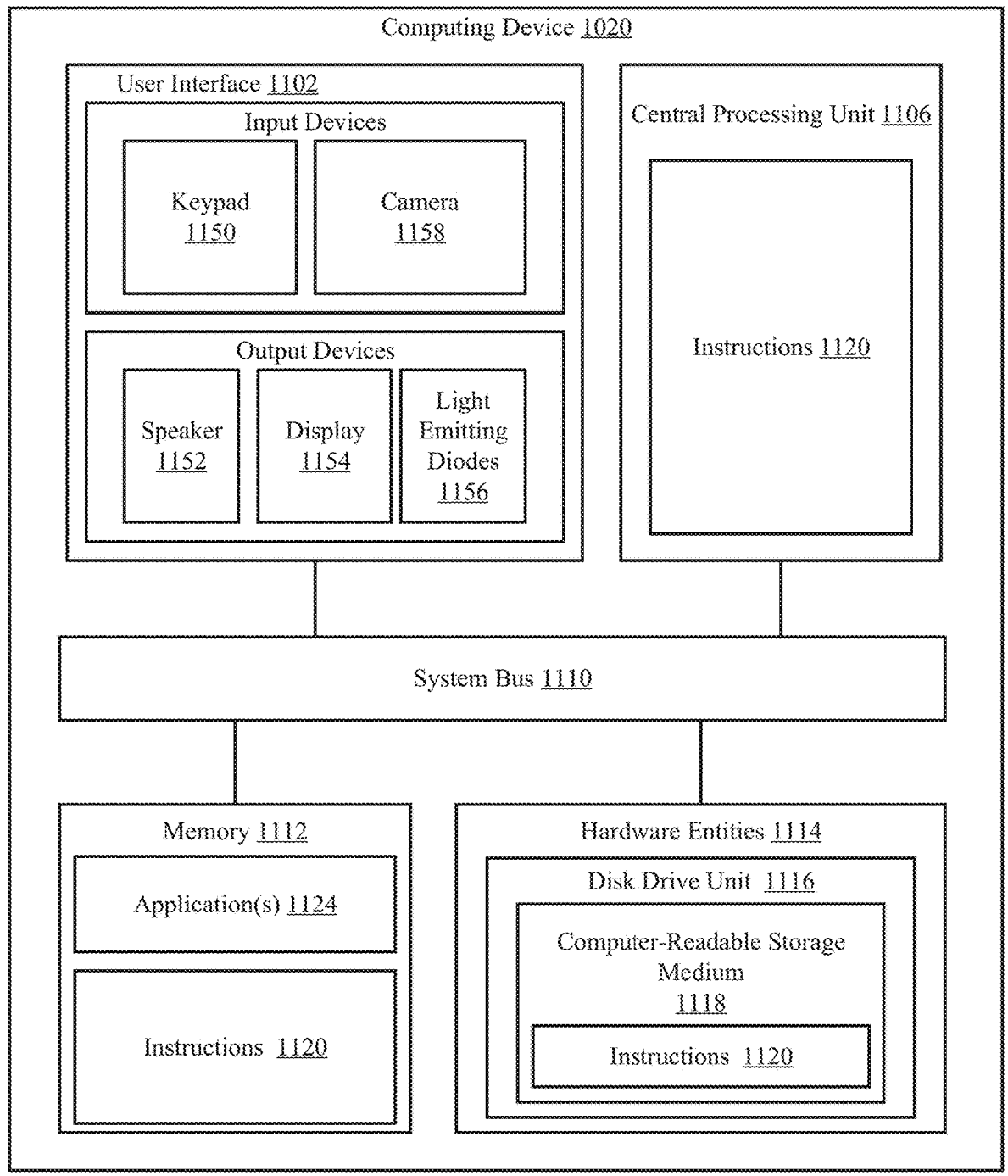
FIG. 11 provides a more detailed block diagram for the computing device shown in FIG. 10.

Referring now to FIG. 11, there is provided a detailed block diagram of an illustrative architecture for the computing device 1020 of FIG. 10. Computing device 1020 may include more or less components than those shown in FIG. 11. However, the components shown are sufficient to disclose an illustrative embodiment implementing the present solution. The hardware architecture of FIG. 11 represents one embodiment of a representative computing device configured to facilitate the incorporation of tags into and with items. As such, the computing device 1020 of FIG. 11 implements at least a portion of a method for incorporating tags into or with items in accordance with the present solution.

Some or all the components of the computing device 1020 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 11, the computing device 1020 comprises a user interface 1102, a Central Processing Unit ("CPU") 1106, a system bus 1110, a memory 1112 connected to and accessible by other portions of computing device 1020 through system bus 1110, and hardware entities 1114 connected to system bus 1110. The user interface can include input devices (e.g., a keypad 1150 and/or a camera 1158) and output devices (e.g., a speaker 1152, a display 1154, and/or Light Emitting Diodes ("LEDs") 1156), which facilitate user-software interactions for controlling operations of the computing device 1020.

At least some of the hardware entities 1114 perform actions involving access to and use of memory 1112, which can be a RAM, a disk driver and/or a Compact Disc Read Only Memory ("CD-ROM"). Hardware entities 1114 can include a disk drive unit 1116 comprising a computer-readable storage medium 1118 on which is stored one or more sets of instructions 1120 (e.g., software code) configured to implement one or more of the methodologies, procedures, or functions described herein. The instructions 1120 can also reside, completely or at least partially, within the memory 1112 and/or within the CPU 1106 during execution thereof by the computing device 1020. The memory 1112 and the CPU 1106 also can constitute machine-readable media. The term "machine-readable media", as used here, refers to a single medium or multiple media (e.g., a centralized or distributed database, and/or associated caches and servers) that store the one or more sets of instructions 1120. The term "machine-readable media", as used here, also refers to any medium that is capable of storing, encoding or carrying a set of instructions 1120 for execution by the computing device 1020 and that cause the computing device 1020 to perform any one or more of the methodologies of the present disclosure.

In some scenarios, the hardware entities 1114 include an electronic circuit (e.g., a processor) programmed for facilitating the incorporation of tags into items. In this regard, it should be understood that the electronic circuit can access and run application(s) 1124 installed on the computing device 1020 that implement the present solution.

Illustrative Methods for Incorporating Tags into/with Items

Figure 12:
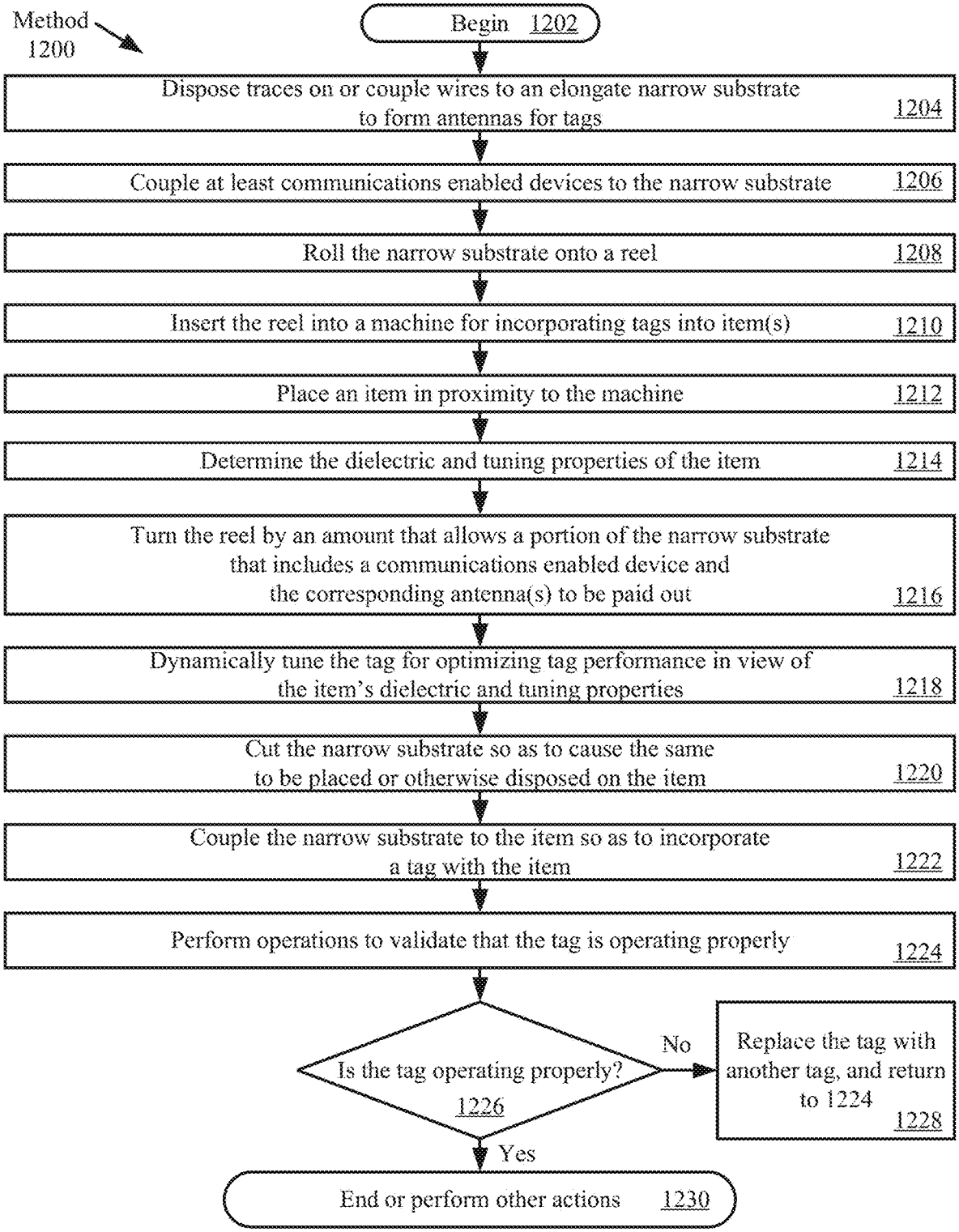
FIGS. 12-15 each provide a flow diagram of an illustrative method for incorporation of tag(s) into or with item(s).

Referring now to FIG. 12, there is provided a flow diagram of an illustrative method 1200 for incorporation of tag(s) (e.g., tag(s) 112, 118 of FIG. 1, 200 of FIG. 2, 400 of FIG. 4, and/or 400$_1$, . . . , 400$_N$ of FIG. 6) into or with item(s) (e.g., item(s) 110, 116 of FIG. 1). For example, a tag is incorporated into a seam, a hem or an overlapping fabric edge finish of a garment or hat. The present solution is not limited to the particulars of this example. In another aspect of the disclosure, for example, the tag may be affixed to an item in a variety of locations by heat welding a layer of material of the tag to a portion of the item or curing of an adhesive that was applied to the tag.

Method 1200 begins with 1202 and continues with 1204 where traces are printed on or wires are coupled to an elongate narrow substrate (e.g., substrate 402 of FIG. 4 or 600 of FIGS. 6-7) to form antennas (e.g., antenna(s) 214 of FIG. 2 or 700 of FIG. 7) for the tags. At least one communications enabled device (e.g., communication enabled device 204 of FIG. 2 or 702 of FIG. 7) is coupled to the narrow substrate in 1206. This coupling can be achieved via an adhesive and/or the application of heat.

Next in 1208, the narrow substrate is rolled onto a reel (e.g., reel 900 of FIG. 9). The reel is inserted into a machine for use in incorporating tags into the item, as shown by 1210. The machine can include, but is not limited to, a dispensing machine (e.g., ribbon dispensing machine 1004 of FIG. 10). Dispensing machines are well known in the art, and therefore will not be described herein. The reel may be rolled using gears (e.g., gear(s) 1006 of FIG. 10) and motors (e.g., motor(s) 1008 of FIG. 10). Gears and motors are well known in the art, and therefore will not be described herein.

In 1212, an item is placed in proximity to the machine. This can be achieved automatically by a conveyer belt (e.g., conveyer belt 1010) or manually by an individual (e.g., individual 1014 of FIG. 10). The item can be in a partially or fully manufactured state at this point in the process. The dielectric and tuning properties of the item are then determined in 1214. This determination can be made by a computing device using an LUT (e.g., LUT 1024 of FIG. 10) and/or sensor data (e.g., capacitive measurements) generated by sensors (e.g., sensors 1016 of FIG. 10) configured to sense dielectric and tuning properties of items. Techniques for sensing the dielectric and tuning properties of items are well known in the art, and therefore will not be described herein. Any known or to be known technique for sensing the dielectric and tuning properties of items can be used herein.

The reel is then turned in 1216 by an amount that allows a portion of the narrow substrate (e.g., portion 600$_1$ and at least portion of 600$_2$ of FIGS. 6-7) that includes a communications enabled device and the corresponding antenna(s) (e.g., tag 400$_1$ of FIGS. 6-7) to be paid out. The tag is dynamically tuned in 1218 for optimizing tag performance in view of the item's dielectric and tuning properties determined in 1214. The tuning can be achieved by: (1) decreasing a thickness of the antenna trace(s) disposed on the narrow substrate (e.g., using a laser or razor); (2) decreasing a width of the antenna trace(s) disposed on the narrow substrate (e.g., using a laser or razor); (3) decreasing a height of the antenna trace(s) disposed on the narrow substrate (e.g., using a laser or razor); (4) removing a portion of the antenna trace(s) disposed on the narrow substrate (e.g., using a laser or razor); (5) clipping one or more ends of the antenna wires coupled to the narrow substrate; and/or (6) sewing metal thread(s) into the item at location(s) where the tag(s) are to reside. The metal thread(s) create capacitance and inductance that tune the tag's operating frequency.

Next in 1220, the narrow substrate is cut (e.g., in portion 600$_2$ of FIGS. 6-7) so as to cause the same to be placed on or otherwise disposed on the item. The cutting of the narrow substrate can be achieved via a cutting mechanism (e.g., cutting mechanism 1030 of FIG. 10 or laser 1026 of FIG. 10) of the dispensing machine. The cutting mechanism can include, but is not limited to, a razor or scissors. The narrow substrate is then coupled to the item so as to incorporate the tag in or with the item, as shown by 1222. This coupling can be achieved via an adhesive, an application of heat, and/or stitching.

Upon completing 1222, operations are performed in 1224 to validate that the tag is operating properly. The validation can be achieved using a tag reader (e.g., tag reader 1018 of FIG. 10). Tag readers are well known in the art, and therefore will not be described herein. The tag reader can transmit interrogation signals to the tag, wait for a response signal from the tag, receive the response signal, and process the response signal. The proper operation of the tag may be validated when the response signal is received in a given amount of time after the interrogation signal transmission, and/or the response signal includes certain information (e.g., a tag identifier).

If a validation is not made that the tag is operating properly [1226:NO], then method 1200 continues with 1228 where the tag is removed from the item and a new tag is coupled to the item. Once the new tag is coupled to the item, method 1200 returns to 1224 where operation of the new tag is tested during a validation process. In contrast, if a validation is made that the tag is operating properly [1226:YES], then 1230 is performed where method 1200 ends or other actions are taken (e.g., finish manufacturing/fabricating the item and/or return to 1204 to incorporate a tag in a next item).

In some cases, it may be undesirable to leave the tag attached to the item when it leaves a facility (e.g., RSF 128 of FIG. 1). Accordingly, a tool (e.g., a heating element, stitching removal device, and/or a robot having an articulating arm with a grasper) may optionally be used to remove all or part of the tag from the item prior to when the item is removed from the facility.

Figure 13:
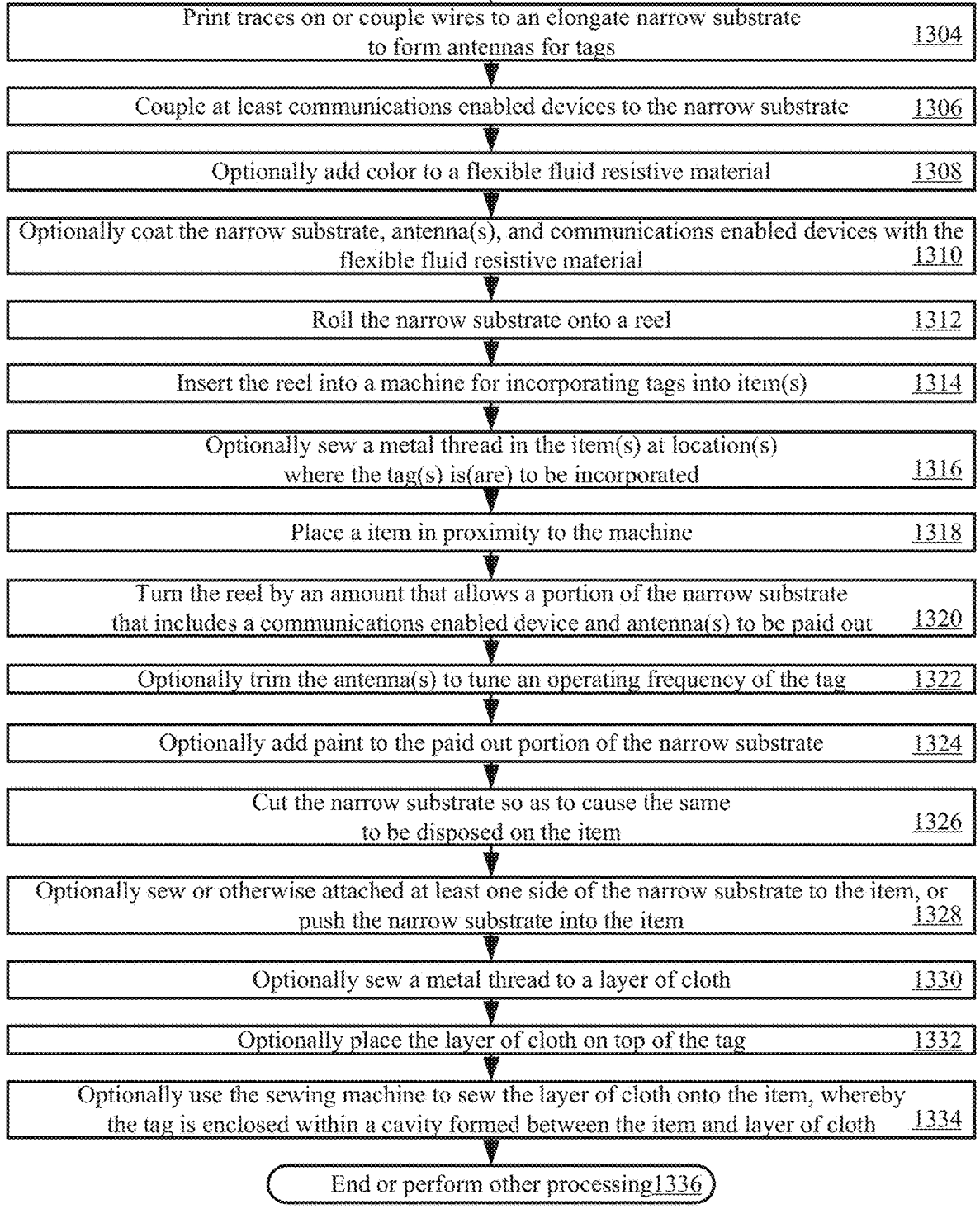

Referring now to FIG. 13, there is provided a flow diagram of an illustrative method 1300 for incorporation of tag(s) (e.g., tag(s) 112, 118 of FIG. 1, 200 of FIG. 2, 400 of FIG. 4, and/or $400_1, \ldots, 400_N$ of FIG. 6) into or with item(s) (e.g., item(s) 110, 116 of FIG. 1). For example, a tag is incorporated into a seam, a hem or an overlapping fabric edge finish of a garment or hat. The present solution is not limited to the particulars of this example. In another aspect of the disclosure, for example, the tag may be affixed to an item in a variety of locations by heat welding to the item or curing of an adhesive that was applied to the tag.

Method 1300 begins with 1302 and continues with 1304 where traces are printed on or wires are coupled to an elongate narrow substrate (e.g., substrate 402 of FIG. 4 or 600 of FIGS. 6-7) to form antennas (e.g., antenna(s) 214 of FIG. 2 or 700 of FIG. 7) for the tags. At least one communications enabled device (e.g., communication enabled device 204 of FIG. 2 or 702 of FIG. 7) is coupled to the narrow substrate in 1306. This coupling can be achieved via an adhesive and/or the application of heat.

Next in 1308, color is optionally added to a flexible fluid resistive material. The color may be selected so that the color of the flexible fluid resistive material matches the color of item(s) to which tag(s) is(are) to be coupled. The flexible fluid resistive material (colored or clear) may then optionally be used to coat the narrow substrate, antenna(s) and communication enabled device(s), as shown by 1310. In one aspect of the disclosure, the color or pattern may also be applied and/or altered by applying heat (e.g., laser 1026 of FIG. 10 or heating 1027 of FIG. 10) to the flexible fluid resistive material.

In 1312, the narrow substrate is rolled onto a reel (e.g., reel 900 of FIG. 9). The reel is inserted into a machine for use in incorporating tags into the item, as shown by 1314. The machine can include, but is not limited to, a dispensing machine (e.g., ribbon dispensing machine 1004 of FIG. 10). Dispensing machines are well known in the art, and therefore will not be described herein. The reel may be rolled using gears (e.g., gear(s) 1006 of FIG. 10) and motors (e.g., motor(s) 1008 of FIG. 10). Gears and motors are well known in the art, and therefore will not be described herein.

In 1316, metal thread(s) is(are) optionally sewn into the item at location(s) where the tag(s) is(are) to be incorporated. The metal thread(s) create capacitance and inductance for tuning the tag(s) so as to provide optimized tag performance in view of the item's dielectric and tuning properties (e.g., impedance). The dielectric and tuning properties of the item may be determined in 1316. This determination can be made by a computing device using an LUT (e.g., LUT 1024 of FIG. 10) and/or sensor data (e.g., capacitive measurements) generated by sensors (e.g., sensors 1016 of FIG. 10) configured to sense dielectric and tuning properties of items. Techniques for sensing the dielectric and tuning properties of items are well known in the art, and therefore will not be described herein. Any known or to be known technique for sensing the dielectric and tuning properties of items can be used herein. The metal threads allow for custom tuning of each item by having different sized metal threads sewn into the items. The metal threads also provide a way to increase the capacitance or inductance from a simple trace/wire antenna so that it has better impedance matching with the communications enabled device and better RF performance.

In 1318, an item is placed in proximity to the machine. This can be achieved automatically by a conveyer belt (e.g., conveyer belt 1010) or manually by an individual (e.g., individual 1014 of FIG. 10). The item can be in a partially or fully manufactured state at this point in the process.

The reel is then turned in 1320 by an amount that allows a portion of the narrow substrate (e.g., portion $600_1$ and at least portion of $600_2$ of FIGS. 6-7) that includes a communications enabled device and the corresponding antenna(s) (e.g., tag $400_1$ of FIGS. 6-7) to be paid out. The antenna(s) are optionally tuned in 1322 for optimizing tag performance in view of the item's dielectric and tuning properties. The tuning can be achieved by decreasing a thickness, height, width or removal of the antenna trace(s) disposed on the narrow substrate (e.g., using a laser or razor), or clipping one or more ends of the antenna wires coupled to the narrow substrate (e.g., using a laser or razor).

In 1324, paint is optionally added to the paid out portion of the narrow substrate. 1324 can be performed as an alternative to 1308 where color is added to the flexible fluid resistive material. The paint is selected so that the color of the painted tag matches the color of the item. In one aspect of the disclosure the color or paint pattern may also be applied and/or altered by applying heat (e.g., laser 1026 of FIG. 10 or heating 1027 of FIG. 10) to the flexible fluid resistive material.

In 1326, the narrow substrate is cut (e.g., in portion $600_2$ of FIGS. 6-7) so as to cause the same to be placed on or otherwise disposed on the item. The cutting of the narrow substrate can be achieved via a cutting mechanism (e.g., cutting mechanism 1030 of FIG. 10 or laser 1026 of FIG. 10) of the dispensing machine. The cutting mechanism can include, but is not limited to, a razor, laser or scissors. The narrow substrate is then coupled to the item so as to incorporate the tag in or with the item, as shown by 1328-1334. As shown by 1328, at least one side of the narrow substrate is sewn or otherwise attached to the item (e.g., via an adhesive or an application of heat). Alternatively, the narrow substrate is pushed into the item. As shown by 1330-1334, the narrow substrate may additionally or alternatively be enclosed within a cavity formed between the item and a layer of cloth. The layer of cloth can be coupled to the item via a sewing machine. In some scenarios, a metal thread is sewn into the layer of cloth for tuning the operating frequency of the tag. Upon coupling the tag to the item and/or validating the tag's performance, 1336 is performed where method 1300 ends or other actions are taken (e.g., finish manufacturing/fabricating the item and/or return to 1304 to incorporate a tag in a next item).

In some cases, it may be undesirable to leave the tag attached to the item when it leaves a facility (e.g., RSF 128 of FIG. 1). Accordingly, a tool (e.g., a heating element, stitching removal device, and/or a robot having an articulating arm with a grasper) may optionally be used to remove all or part of the tag from the item prior to when the item is removed from the facility.

Figure 14:
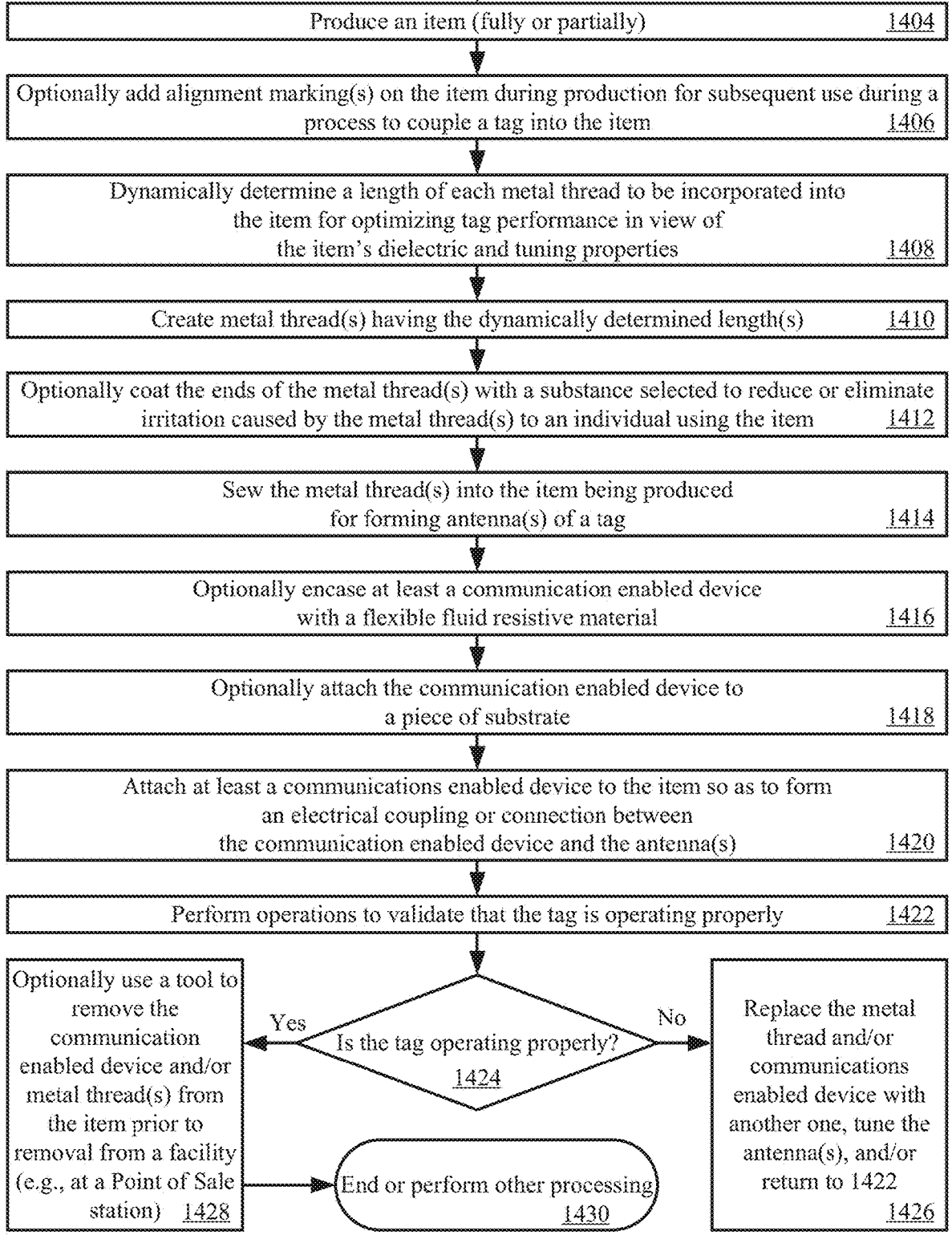

Referring now to FIG. 14, there is provided a flow diagram of an illustrative method 1400 for incorporation of tag(s) (e.g., tag(s) 112, 118 of FIG. 1, 200 of FIG. 2, 400 of FIG. 4, and/or $400_1, \ldots, 400_N$ of FIG. 6) into or with item(s) (e.g., item(s) 110, 116 of FIG. 1 and/or item 1012 of FIG. 10). For example, a tag is incorporated into a seam, a hem or an overlapping fabric edge finish of a garment or hat. The present solution is not limited to the particulars of this example. In another aspect of the disclosure, for example, the tag may be affixed to an item in a variety of locations by heat welding to the item or curing of an adhesive that was applied to the tag.

Method 1400 begins with 1402 and continues with 1404 where an item (e.g., item 1012 of FIG. 10) is fully or partially produced. Alignment marking(s) is(are) optionally added to the item in 1406. The alignment markings can be used in a subsequent process to couple a tag (e.g., tag 200 of FIG. 2) to the item. In this regard, the alignment markings can clearly show where the tag is to be placed on the item, and help guide such placement. The alignment markings can include, but are not limited to, shape(s) or line(s) printed on the item (e.g., in a color different than the item's color), created by stitching (e.g., using thread in a color different than the item's color), and/or formed using die(s) (e.g., a die with a color different than the item's color).

In 1408, a length of each metal thread that is to be incorporated into the item to form a tag antenna (e.g., antenna 214 of FIG. 2) is dynamically determined. The length of each metal thread can be selected for optimizing tag performance based on the dielectric and tuning properties of the item (e.g., item 1012 of FIG. 10). The dielectric and tuning properties of the item may be determined by a computing device (e.g., computing device 1020 of FIG. 10) using an LUT (e.g., LUT 1024 of FIG. 10) and/or sensor data (e.g., capacitive measurements) generated by sensors (e.g., sensors 1016 of FIG. 10) configured to sense dielectric and tuning properties of items. Techniques for sensing the dielectric and tuning properties of items are well known in the art, and therefore will not be described herein. Any known or to be known technique for sensing the dielectric and tuning properties of items can be used herein.

In 1410, metal thread(s) having the dynamically determined length(s) is(are) created. This can involve cutting piece(s) of metal thread from a spool of metal thread (e.g., spool 1050 of FIG. 10) using a cutting mechanism (e.g., cutting mechanism 1030 of FIG. 10) and/or tuning each piece of metal thread by cutting one or more ends thereof (e.g., using cutting mechanism 1030 of FIG. 10 and/or a laser 1026 of FIG. 10). Ends of the metal thread(s) are optionally coated in 1412 with a substance selected to reduce or eliminate irritation caused by the metal thread(s) to an individual using the item. The metal thread(s) is(are) then sewn by a sewing machine (e.g., sewing machine 1032 of FIG. 10) into the item being produced for forming tag antenna(s) (e.g., antenna(s) 214 of FIG. 2), as shown by 1414. Notably, the metal thread(s) is(are) very difficult to feel in the item.

In 1416, at least a communication enabled device (e.g., communication enabled device 204 of FIG. 2) is optionally encased with a flexible fluid resistive material (e.g., flexible fluid resistive material 406 of FIG. 4A). The flexible fluid resistive material may be clear or colored. The color of the flexible fluid resistive material may be selected so that it matches the color of the item to which the tag is being incorporated. The color may be added to the flexible fluid resistive material in 1416.

In 1418, the communication enabled device is optionally attached to a piece of substrate (e.g., PET or Mylar) (e.g., substrate 402 of FIG. 4A). This attachment can be achieved via an adhesive, an application of heat, and/or stitching. The piece of substrate is provided to facilitate the attachment of the communication enabled device to the item.

In 1420, the communication enabled device is attached to the item so as to form an electrical coupling, inductive coupling, or connection between the communication enabled device and the metal thread antenna(s). This attachment can be achieved via an adhesive, an application of heat and/or stitching.

Upon completing 1420, operations are performed in 1422 to validate that the tag is operating properly. The validation can be achieved using a tag reader (e.g., tag reader 1018 of FIG. 10). Tag readers are well known in the art, and therefore will not be described herein. The tag reader can transmit interrogation signals to the tag, wait for a response signal from the tag, receive the response signal, and process the response signal. The proper operation of the tag may be validated when the response signal is received in a given amount of time after the interrogation signal transmission, and/or the response signal includes certain information (e.g., a tag identifier).

If a validation is not made that the tag is operating properly [1424:NO], then method 1400 continues with 1426 where the metal thread(s) and/or communications enabled device is(are) removed from the item and a new one(s) thereof is(are) coupled to the item. Additionally or alternatively, the antenna(s) is(are) tuned by removing at least a portion of each metal thread (e.g., by removing a free end of each metal thread). Once these actions are taken, method 1400 returns to 1422 where operation of the tag is tested during a validation process.

In contrast, if a validation is made that the tag is operating properly [1424:YES], then 1428 and/or 1430 is(are) performed. In some cases, it may be undesirable to leave the tag attached to the item when it leaves a facility (e.g., RSF 128 of FIG. 1). Accordingly, a tool (e.g., a heating element, stitching removal device, and/or a robot having an articulating arm with a grasper) may optionally be used in 1522 to remove the communication enabled device, device mounting assembly and/or metal thread(s) from the item prior to when the item is removed from the facility. Subsequently, 1430 is performed where method 1400 ends or other actions are performed (e.g., finish manufacturing/fabricating the item and/or return to 1402 to incorporate a tag in a next item).

Figure 15:
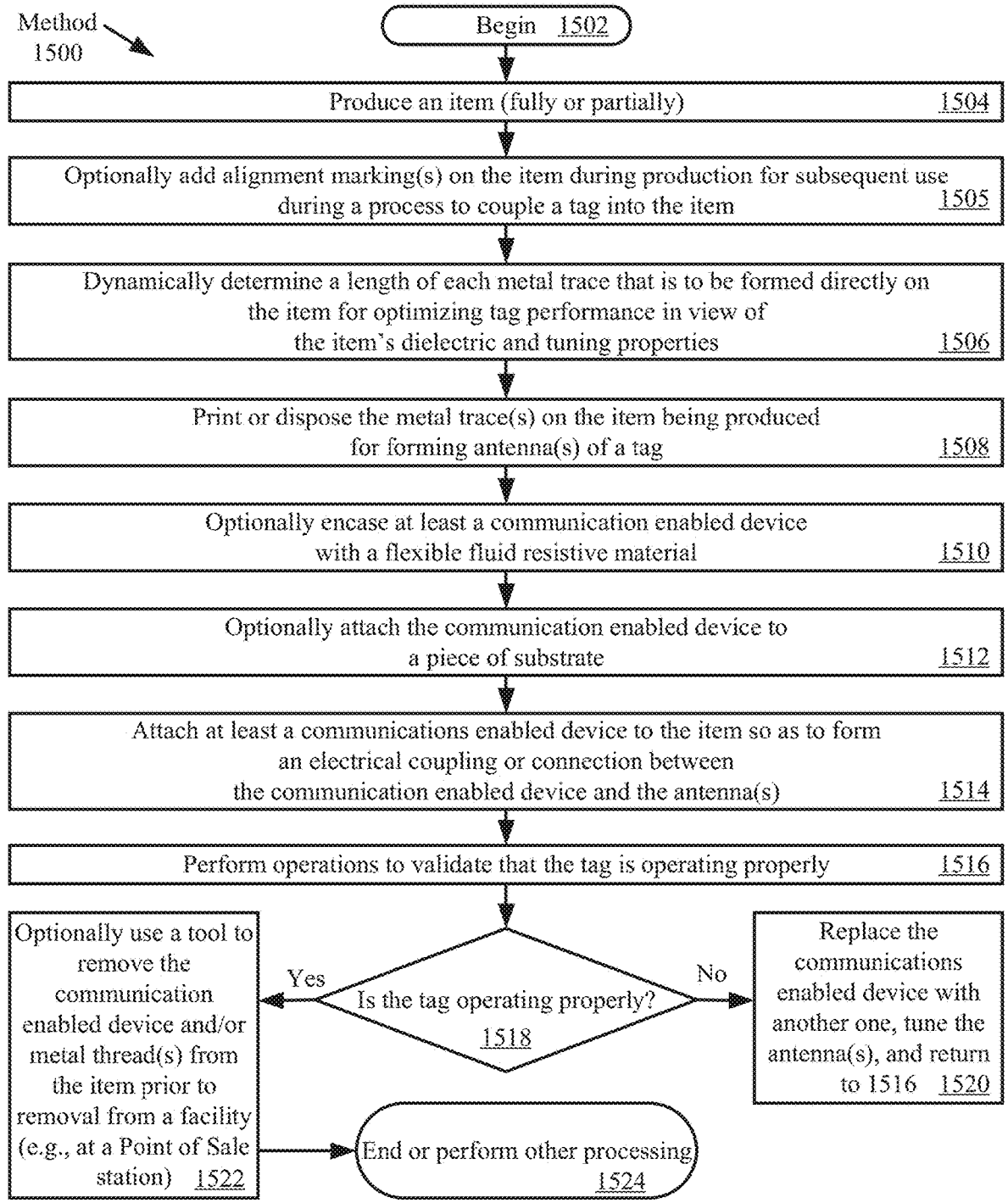

Referring now to FIG. 15, there is provided a flow diagram of an illustrative method 1500 for incorporation of tag(s) (e.g., tag(s) 112, 118 of FIG. 1, 200 of FIG. 2, 400 of FIG. 4, and/or $400_1, \ldots, 400_N$ of FIG. 6) into or with item(s) (e.g., item(s) 110, 116 of FIG. 1). For example, a tag is incorporated into a seam, a hem or an overlapping fabric edge finish of a garment or hat. The present solution is not limited to the particulars of this example. In another aspect of the disclosure, for example, the tag may be affixed to an item in a variety of locations by heat welding to the item or curing of an adhesive that was applied to the tag.

Method 1500 begins with 1502 and continues with 1504 where an item (e.g., item 1012 of FIG. 10) is fully or partially produced. Alignment marking(s) is(are) optionally added to the item in 1505. The alignment markings can include, but are not limited to, shape(s) or line(s) printed on the item (e.g., in a color different than the item's color), created by stitching (e.g., using thread in a color different than the item's color), and/or formed using die(s) (e.g., a die with a color different than the item's color). The alignment markings can be used in a subsequent process to couple a tag to the item. In this regard, the alignment markings can clearly show where some or all components of the tag are to be placed on the item, and help guide such placement.

In 1506, a length of each metal trace that is to be disposed directly on the item to form a tag antenna (e.g., antenna 214 of FIG. 2) is dynamically determined. The length of each metal trace can be selected for optimizing tag performance based on the dielectric and tuning properties of the item. The dielectric and tuning properties of the item may be determined by a computing device (e.g., computing device 1020 of FIG. 10) using an LUT (e.g., LUT 1024 of FIG. 10) and/or sensor data (e.g., capacitive measurements) generated by sensors (e.g., sensors 1016 of FIG. 10) configured to sense dielectric and tuning properties of items. Techniques for sensing the dielectric and tuning properties of items are well known in the art, and therefore will not be described herein. Any known or to be known technique for sensing the dielectric and tuning properties of items can be used herein.

In 1508, metal trace(s) having the dynamically determined length(s) is(are) printed or otherwise disposed on the item so as to form the tag antenna(s). The metal trace(s) may optionally be tuned after being printed or otherwise disposed on the item. The tuning can be achieved by decreasing a thickness, width, height, or removal of a metal trace at one or more ends thereof (e.g., using a laser 1026 of FIG. 10). The metal traces can be formed of any suitable material, such as copper, silver, aluminum or any electrically-conductive material. The metal traces can be otherwise disposed on the item in accordance with any known or to be known deposition technique (e.g., sputtering, printing).

In 1510, at least a communication enabled device (e.g., communication enabled device 204 of FIG. 2) is optionally encased with a flexible fluid resistive material (e.g., flexible fluid resistive material 406 of FIG. 4A). The flexible fluid resistive material may be clear or colored. The color of the flexible fluid resistive material may be selected so that it matches the color of the item to which the tag is being incorporated. The color may be added to the flexible fluid resistive material in 1510. In one aspect of the disclosure, the color or pattern may also be applied and/or altered by applying heat (e.g., laser 1026 of FIG. 10 or heating 1027 of FIG. 10) to the flexible fluid resistive material.

In 1512, the communication enabled device is optionally attached to a piece of substrate (e.g., PET or Mylar) (e.g., substrate 402 of FIG. 4A). This attachment can be achieved via an adhesive, an application of heat, and/or stitching. The substrate can facilitate the attachment of the communication enabled device to the item.

In 1514, the communication enabled device is attached to the item so as to form an electrical coupling, inductive coupling, or connection between the communication enabled device and the metal trace antenna(s). This attachment can be achieved via an adhesive, an application of heat and/or stitching.

Upon completing 1514, operations are performed in 1516 to validate that the tag is operating properly. The validation can be achieved using a tag reader (e.g., tag reader 1018 of FIG. 10) and/or computing device (e.g., computing device 1020 of FIG. 10). Tag readers are well known in the art, and therefore will not be described herein. The tag reader can transmit interrogation signals to the tag, wait for a response signal from the tag, receive the response signal, and process the response signal. An output of the tag reader may optionally be provided to the computing device for processing. The proper operation of the tag may be validated when the response signal is received in a given amount of time after the interrogation signal transmission, and/or the response signal includes certain information (e.g., a tag identifier).

If a validation is not made that the tag is operating properly [1518:NO], then method 1500 continues with 1520 where the communications enabled device is removed from the item and a new communications enabled device is coupled to the item. The antenna(s) may also be tuned in 1520 by decreasing a thickness of each conductive trace of a given portion thereof (e.g., of a free end). Once the new tag is coupled to the item, method 1500 returns to 1516 where operation of the new tag is tested during a validation process.

In contrast, if a validation is made that the tag is operating properly [1518:YES], then 1522 and/or 1524 is(are) performed. In some cases, it may be undesirable to leave the tag attached to the item when it leaves a facility (e.g., RSF 128 of FIG. 1). Accordingly, a tool (e.g., a heating element, stitching removal device, and/or a robot having an articulating arm with a grasper) may optionally be used in 1522 to remove the communication enabled device, device mounting assembly and/or metal thread(s) from the item prior to when the item is removed from the facility. Subsequently, 1524 is performed where method 1500 ends or other actions are performed (e.g., finish manufacturing/fabricating the item and/or return to 1502 to incorporate a tag in a next item).

Thus, the present disclosure includes any combination of the following examples:

Example 1: A method for producing a radio frequency identification (RFID) tag, comprising: determining, by a computing device, a characteristic of a conductive trace on a substrate to be incorporated into an item to configure a tag performance in view of at least one of a dielectric property or a tuning property of the item; altering the conductive trace on the substrate to have the characteristic, using a laser, to define an antenna for the tag; and attaching a communications enabled device to the substrate so as to form an electrical connection between the communications enabled device and the antenna to form the tag.

Example 2: The method according to example 1, further comprising determining at least one of the dielectric property or the tuning property of the item using a look up table, sensor data, or a pre-determined value, prior to determining the characteristic of the conductive trace.

Example 3: The method according to any of the prior examples, wherein the characteristic of the conductive trace comprises at least one of a thickness, a width, a height, or a location.

Example 4: The method according to any of the prior examples, wherein the determining, and the attaching are performed before the item is fabricated.

Example 5: The method according to any of the prior examples, wherein the determining, and the attaching are performed during fabrication of the item.

Example 6: The method according to any of the prior examples, furthering comprising coating one or both sides of the tag with a flexible fluid resistive material.

Example 7: The method according to any of the prior examples, wherein the flexible fluid resistive material is configured to be visibly altered by the laser.

Example 8: The method according to any of the prior examples, further comprising applying heat, via the laser, to visibly alter the flexible fluid resistive material thereby generating at least one of a change in color or a change in pattern on the flexible fluid resistive material.

Example 9: The method according to any of the prior examples, further comprising forming the conductive trace on the substrate with an initial characteristic different from the characteristic determined by the computing device.

Example 10: The method according to any of the prior examples, further comprising affixing the tag to the item.

Example 11: The method according to any of the prior examples, further comprising applying an adhesive, and heating the adhesive by the laser to heat weld or cure the adhesive to affix the tag to the item.

Example 12: A system, comprising: a memory; a processor coupled to the memory and configured to determine a characteristic of a conductive trace on a substrate to be incorporated into an item to configure a tag performance in view of at least one of a dielectric property or a tuning property of the item; a laser configured to alter the conductive trace on the substrate to have the characteristic to define an antenna for the tag; an attaching device configured to attach a communications enabled device to the substrate so as to form an electrical connection between the communications enabled device and the antenna to form the tag.

Example 13: The system of according to example 12, wherein the laser is further configured to heat and affix the tag onto the item.

Example 14: The system according to any of the prior system examples, wherein at least one of the dielectric property or the tuning property of the item are determined using a look up table, sensor data, or a pre-determined value, prior to determining the characteristic of the conductive trace.

Example 15: The system according to any of the prior system examples, wherein the characteristic of the conductive trace comprise at least one of a thickness, a width, a height, or a location.

Example 16: The system according to any of the prior system examples, wherein one or both sides of the tag is coated with a flexible fluid resistive material.

Example 17: The system according to any of the prior system examples, wherein the flexible fluid resistive material is configured to be visibly altered by the laser.

Example 18: The system according to any of the prior system examples, wherein the laser is configured to apply heat to visibly alter the flexible fluid resistive material to generating a change in at least one of a color or a pattern of the flexible fluid resistive material.

Example 19: The system according to any of the prior system examples, further comprising an applicator to apply the conductive trace to a the substrate, wherein the substrate comprises a flexible substrate.

Example 20: The system according to any of the prior system examples, wherein the flexible substrate comprises at least one of plastic, TPU, silk, cotton, or paper.

Example 21: The system according to any of the prior system examples, wherein the attaching device is configured to apply an adhesive to affix the tag to the item.

Example 22: The system according to any of the prior system examples, further comprising a light source configured to apply a light to heat the adhesive to heat weld or cure the adhesive to affix the tag to the item.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for producing a radio frequency identification (RFID) tag, comprising:
   altering a conductive trace by removing a portion of conductive material of the conductive trace using a laser to have a characteristic to define an antenna for the RFID tag; and
   attaching a communications enabled device so as to form an electrical connection between the communications enabled device and the antenna to form the RFID tag;
   wherein the removing the portion of the conductive material in an area of the conductive trace using the laser includes at least one of decreasing a thickness of the conductive trace, decreasing a width of the conductive trace, or decreasing a height of the conductive trace while leaving a remaining portion in the area of the conductive material.

2. The method according to claim 1, further comprising determining the characteristic of the conductive trace to be incorporated into an item to configure a tag performance in view of at least one of a dielectric property or a tuning property of the item.

3. The method according to claim 2, further comprising determining at least one of the dielectric property or the tuning property of the item using a look up table, sensor data, or a pre-determined value, prior to determining the characteristic of the conductive trace.

4. The method according to claim 2, wherein the determining, and the attaching are performed before the item is fabricated.

5. The method according to claim 2, wherein the determining, and the attaching are performed during fabrication of the item.

6. The method according to claim 2, furthering comprising coating one or both sides of the RFID tag with a flexible fluid resistive material.

7. The method according to claim 6, wherein the flexible fluid resistive material is configured to be visibly altered by the laser.

8. The method according to claim 7, further comprising applying heat, via the laser, to visibly alter the flexible fluid resistive material thereby generating at least one of a change in color or a change in pattern on the flexible fluid resistive material.

9. The method according to claim 1, wherein the characteristic of the conductive trace comprises at least one of a thickness, a width, a height, or a location.

10. The method according to claim 1, further comprising forming the conductive trace on a substrate with an initial characteristic different from the characteristic determined.

11. The method according to claim 1, further comprising affixing the RFID tag to an item.

12. The method according to claim 11, further comprising applying an adhesive, and heating the adhesive by the laser to heat weld or cure the adhesive to affix the RFID tag to the item.

13. A system, comprising:
a memory;
a processor coupled to the memory and configured to determine a characteristic of a conductive trace;
a laser configured to alter the conductive trace by removing a portion of a conductive material of the conductive trace to have the characteristic to define an antenna for a tag; and
an attaching device configured to attach a communications enabled device to form an electrical connection between the communications enabled device and the antenna to form the tag;
wherein the removing the portion of the conductive material in an area of the conductive trace using the laser includes at least one of decreasing a thickness of the conductive trace, decreasing a width of the conductive trace, or decreasing a height of the conductive trace while leaving a remaining portion in the area of the conductive material.

14. The system according to claim 13, wherein the determined characteristic of the conductive trace is to be incorporated into an item to configure performance of the tag in view of at least one of a dielectric property or a tuning property of the item.

15. The system according to claim 14, wherein at least one of the dielectric property or the tuning property of the item are determined using a look up table, sensor data, or a pre-determined value, prior to determining the characteristic of the conductive trace.

16. The system according to claim 13, wherein the characteristic of the conductive trace comprise at least one of a thickness, a width, a height, or a location.

17. The system according to claim 13, wherein one or both sides of the tag is coated with a flexible fluid resistive material.

18. The system according to claim 17, wherein the flexible fluid resistive material is configured to be visibly altered by the laser.

19. The system according to claim 18, wherein the laser is configured to apply heat to visibly alter the flexible fluid resistive material to generating a change in at least one of a color or a pattern of the flexible fluid resistive material.

20. The system according to claim 13, wherein the laser is further configured to heat and affix the tag onto an item.

21. The system according to claim 13, further comprising an applicator to apply the conductive trace to a substrate, wherein the substrate comprises a flexible substrate.

22. The system according to claim 21, wherein the flexible substrate comprises at least one of plastic, TPU, silk, cotton, or paper.

23. The system according to claim 13, wherein the attaching device is configured to apply an adhesive to affix the tag to an item.

24. The system according to claim 23, further comprising a light source configured to apply a light to heat the adhesive to heat weld or cure the adhesive to affix the tag to the item.

* * * * *